(12) United States Patent
Dann

(10) Patent No.: US 8,894,023 B2
(45) Date of Patent: Nov. 25, 2014

(54) PIPE SPACER AND CLAMP

(76) Inventor: Jonathan Dann, Oakland, CA (US)

( * ) Notice: Subject to any disclaimer, the term of this patent is extended or adjusted under 35 U.S.C. 154(b) by 766 days.

(21) Appl. No.: 11/974,090

(22) Filed: Oct. 11, 2007

(65) Prior Publication Data

US 2009/0065659 A1  Mar. 12, 2009

Related U.S. Application Data

(63) Continuation-in-part of application No. 11/899,501, filed on Sep. 6, 2007, now abandoned.

(51) Int. Cl.
| | | |
|---|---|---|
| *F16L 3/08* | (2006.01) | |
| *F16L 3/24* | (2006.01) | |
| *F16L 3/127* | (2006.01) | |

(52) U.S. Cl.
CPC .. *F16L 3/24* (2013.01); *F16L 3/127* (2013.01)
USPC ............. 248/74.4; 248/74.1; 248/63; 248/58; 248/62

(58) Field of Classification Search
USPC ......... 248/58, 60, 62, 63, 73, 74.1, 74.3, 74.4
See application file for complete search history.

(56) References Cited

U.S. PATENT DOCUMENTS

| | | | |
|---|---|---|---|
| 936,552 A | | 10/1909 | Morrill |
| 2,141,032 A | * | 12/1938 | Cordell ........................... 248/70 |
| 3,417,951 A | | 12/1968 | Rebentisch, Jr. |
| 3,684,223 A | | 8/1972 | Logsdon |
| 4,259,981 A | | 4/1981 | Busse |
| 5,234,520 A | | 8/1993 | McClintock |
| 7,318,567 B2 | | 1/2008 | Mori et al. |

OTHER PUBLICATIONS

International Search Report Dated January 16, 2009.

* cited by examiner

*Primary Examiner* — Nkeisha Smith
(74) *Attorney, Agent, or Firm* — Fay Sharpe LLP

(57) ABSTRACT

An improved pipe clamp for supporting a length of pipe such that the pipe is secured in a stand-off position. The pipe clamp includes a pipe holding section, a spacer section, and a connection arrangement. The pipe holding section includes a cavity that is designed to encircle over 50% of an outer perimeter of the pipe. The spacer section includes at least one spacer flange that is connected between the pipe holding section and the connection arrangement and forms a space between the pipe holding section and the connection arrangement. The connection arrangement designed to be secured to a building structure.

21 Claims, 15 Drawing Sheets

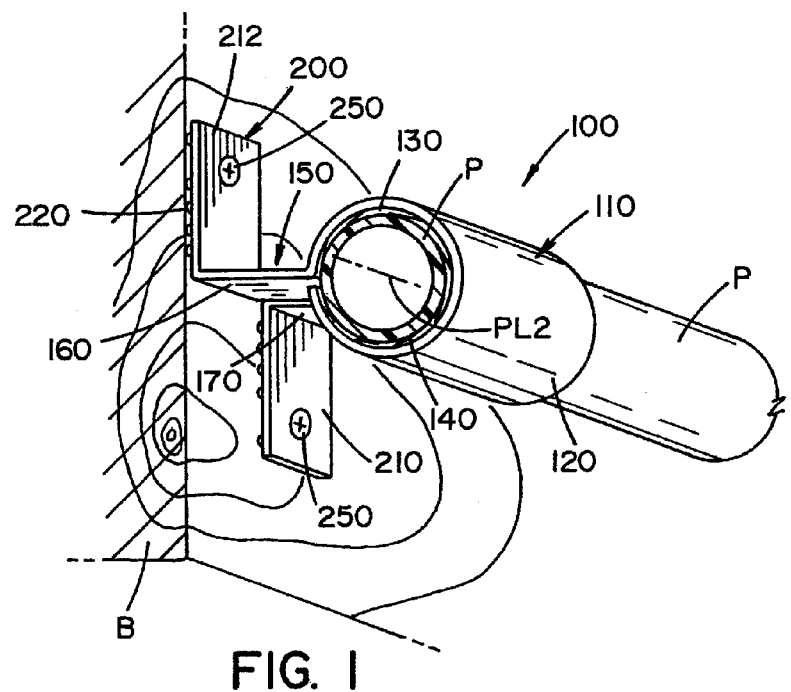
FIG. 1
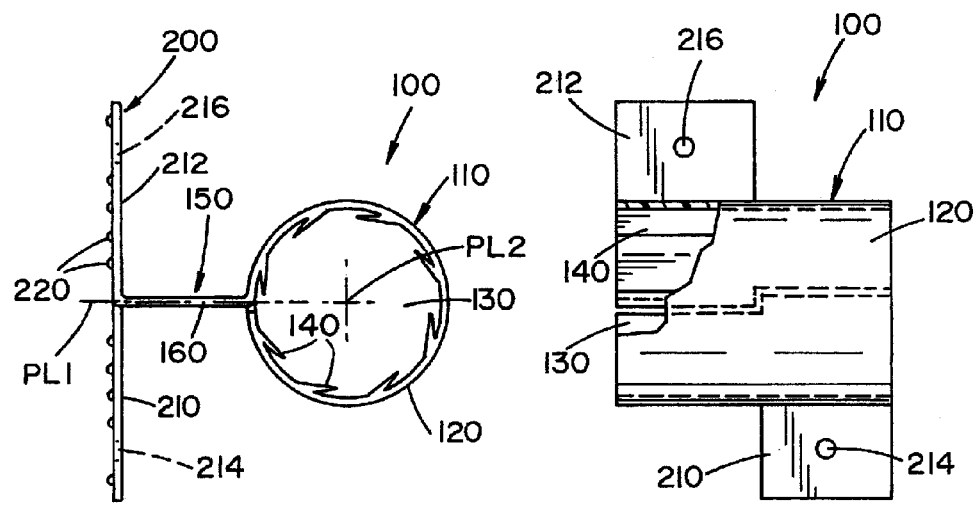
FIG. 2
FIG. 3

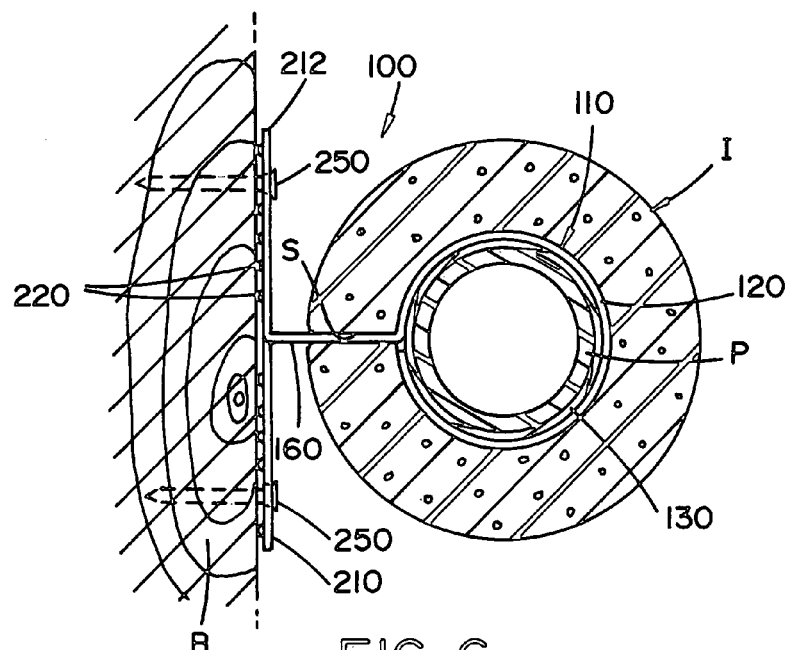
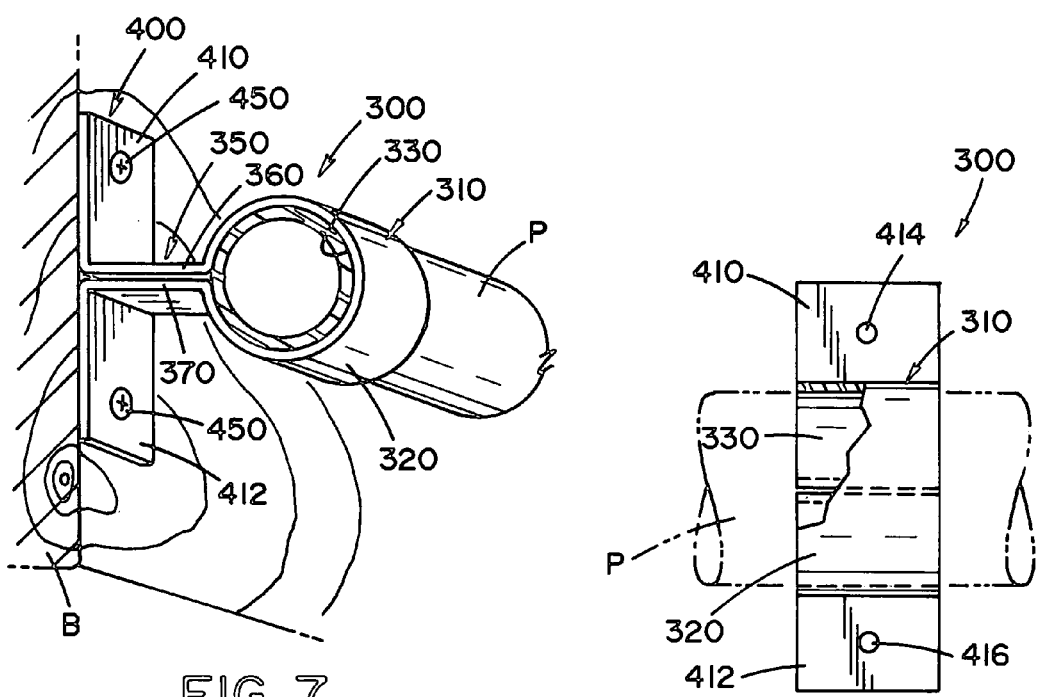

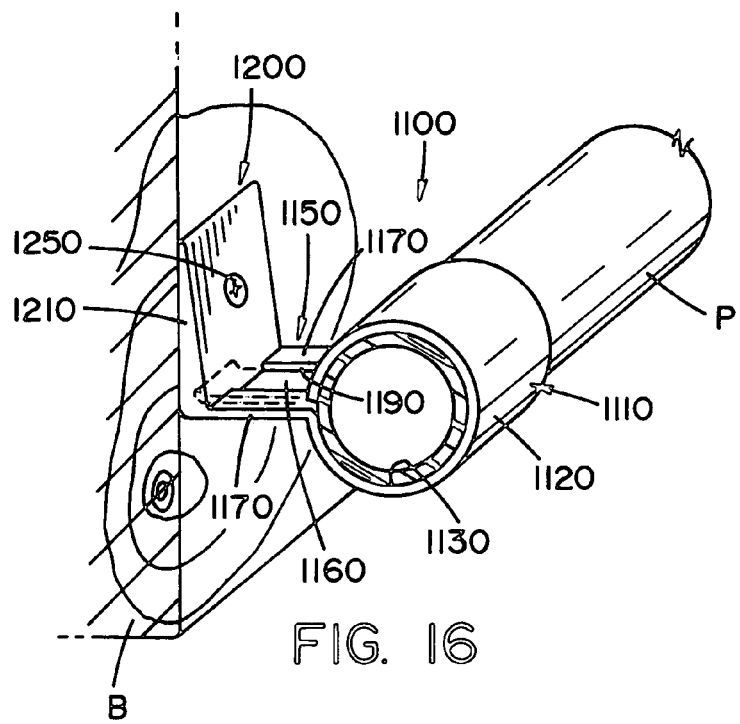
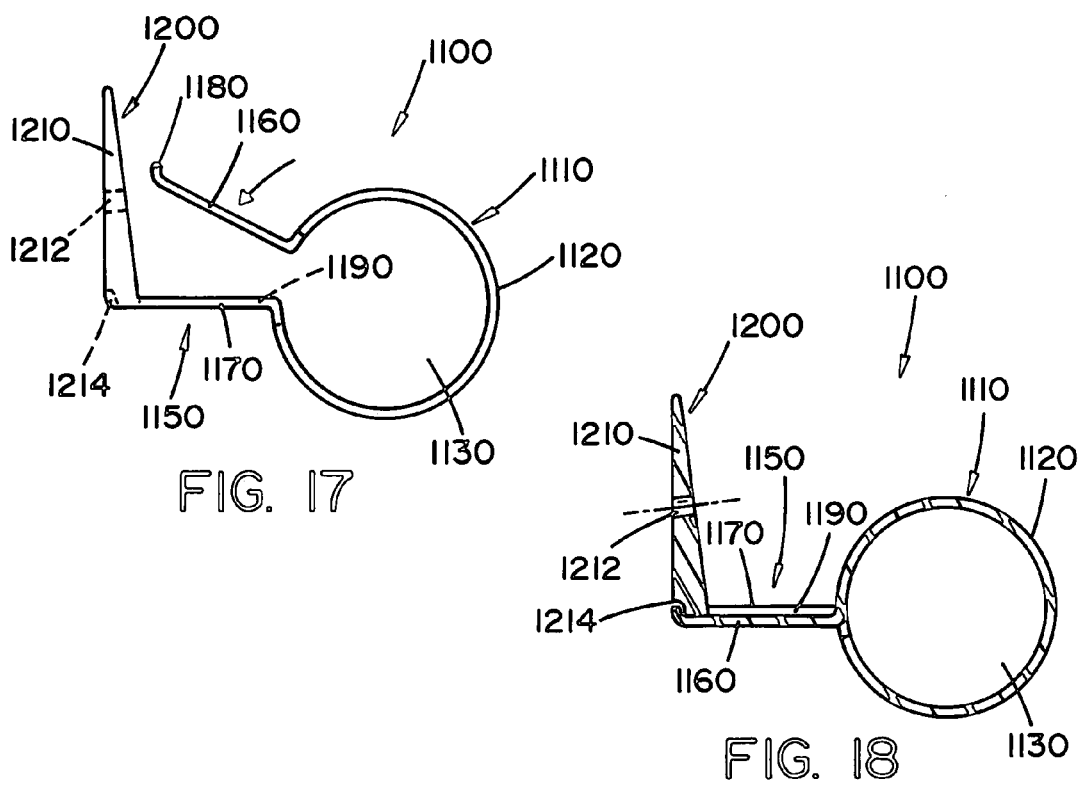

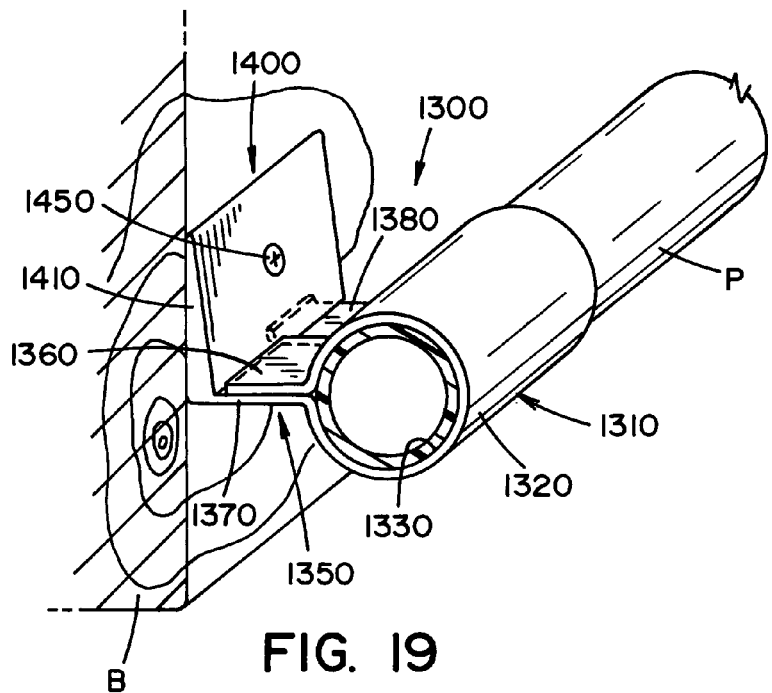
FIG. 19
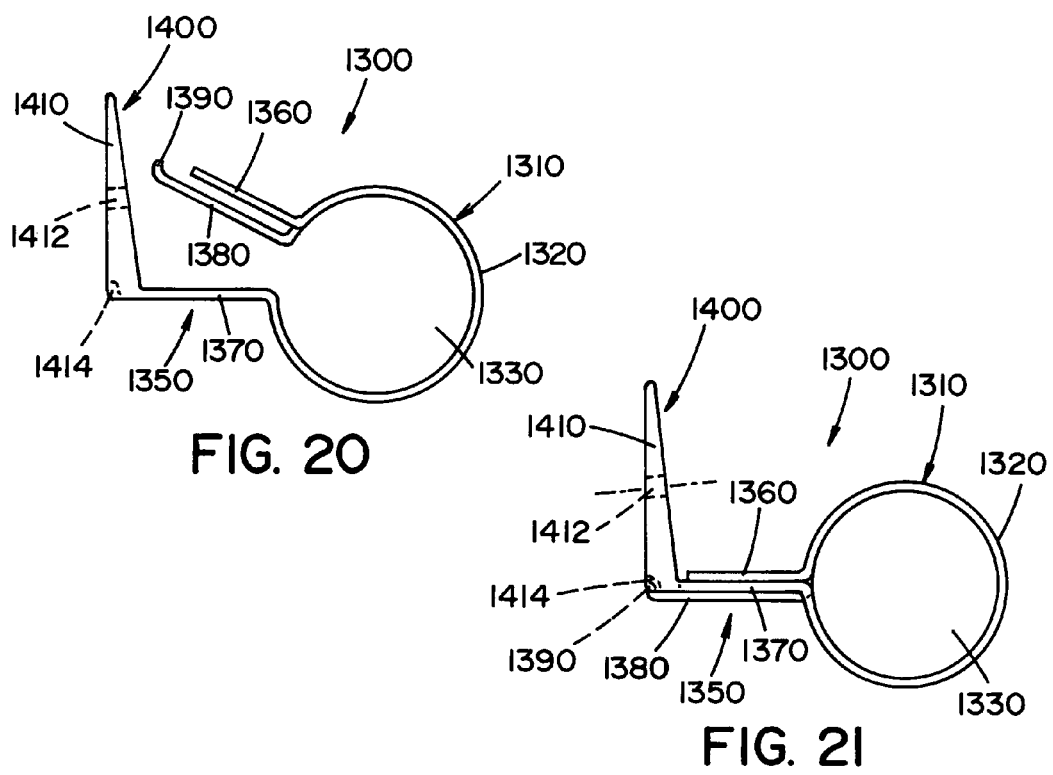
FIG. 20
FIG. 21

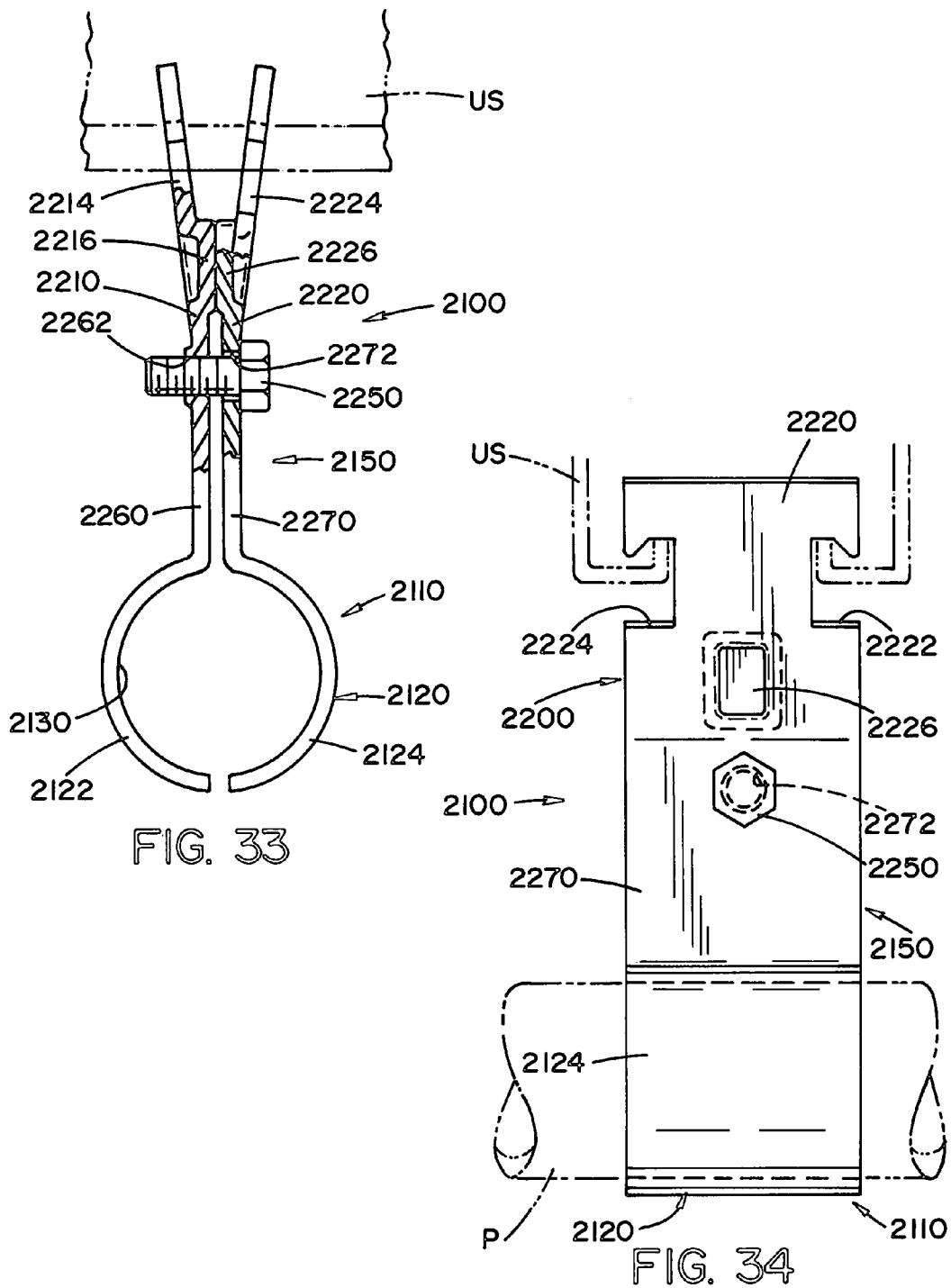

PIPE SPACER AND CLAMP

The present invention is a continuation-in-part of U.S. patent application Ser. No. 11/899,501 filed Sep. 6, 2007 now abandoned entitled "Pipe Spacer and Clamp" which is incorporated herein by reference.

The present invention relates to devices for supporting elongate members, more particularly relates to an improved spacer and clamp for supporting lengths of pipe, and even more particularly relates to an improved spacer and clamp for supporting lengths of pipe to enable insulation to be easily and/or conveniently placed about at least a portion of a pipe.

BACKGROUND OF THE INVENTION

As energy costs increase, many consumers look for ways to cut the energy costs associated with their home. In addition, various state and federal programs have been created to provide tax incentives for homeowners and businesses to reduce energy consumption. One of the larger energy consumption units in a home or business is the hot water heater. Many manufacturers have improved the efficiency of hot water heaters based on state and federal requirements and consumer demand. Although the efficiency of hot water heaters has increased, the pipes that are connected to the hot water heater and which supply hot water to various regions in a home or business are typically not insulated. As such, significant energy loss still occurs from the uninsulated pipes.

Pipes that convey cold water can also be insulated, especially in cold environments so as to inhibit or prevent the freezing of the water in the pipe. Pipes that convey cold water are also insulated to prevent condensation and moisture damage.

Pipe insulation for pipes is readily available, but such insulation is very difficult to insert about an installed pipe. Conventional pipe insulation for standard business and household pipes (e.g, 0.5-3 includes in diameter) typically is manufactured in axially sized portions for a particular diameter pipe. This insulation generally includes a longitudinal slit to enable an installer to fit the insulation about a pipe. One or both face surfaces of the slit can include an adhesive to secure together the faces of slit.

Typical pipe clamps that are used to secure a pipe in position either secure the pipe directly to a surface or hang the pipe from a surface. Clamps that secure the pipe directly to a surface are commonly referred to as "clevis hangers." The pipes are typically hung in a home or business prior to insulation being placed on the pipe. The use of the standard pipe clamps makes it difficult and time consuming to fit the pipe insulation about the pipe. Typically an installer has to notch the insulation around the building structure in contact with the pipe, leaving the underside of the pipe uninsulated. Furthermore, an installer typically has to cut out a portion of the insulation where the clamp is located, thereby allowing the insulation halves to be fitted about the pipe and over the clamps. In some situations, the installer must then "putty over" and/or otherwise seal the cut out holes to reduce heat loss from the pipe. These operations take a significant amount of time, thus significantly increasing the cost of installing the insulation. In addition to the increased installation costs, the sealant used about the pipe clamps may not adequately insulate the pipe as well as the insulation. In addition, the sealant over time can deteriorate, thus result in cracks and ultimately break away from the pipe and clamps. In regions where the pipe lays flat against the wall or beam, it is nearly impossible to fit the insulation about the pipe.

In view of the current state of the art of pipe clamps, there is a need for a pipe clamp that can easily and effectively hang pipes in a home or business and which allows for easy installation of pipe insulation after the pipe has been hung.

SUMMARY OF THE INVENTION

The present invention is directed to devices for supporting elongate members, more particularly relates to an improved spacer and clamp for supporting lengths of pipe, and even more particularly relates to an improved spacer and clamp for supporting lengths of pipe to enable insulation to be easily placed about the pipe.

The stand off pipe clamps of the present invention have one or more of the following features, namely 1) that the clamp that holds the pipe have a low profile, thus not be bulky, 2) that the standoff of the pipe clamp be generally parallel with the pipe when holding the pipe, and/or 3) that the standoff of the pipe clamp be of sufficient length to enable the intended pipe insulation to fit around the pipe without interference. The stand off feature improved spacer and clamp can also or alternatively be useful for pipes (insulated, non-insulated) so as to facilitate in the use of such pipes with cross wires, cross pipes, other small obstructions on a structure on which the pipe is to be installed, etc. The stand off feature improved spacer and clamp can also or alternatively be used to enable dry wall, paneling, etc. to be applied directly to ceiling beams etc. The invention will be described in reference to pipes; however, it will be appreciated that the pipe spacer and clamp can be used for other types of applications (e.g., cables, etc.). The improved spacer and clamp of the present invention includes at least three components, namely 1) a pipe holding section, 2) a spacer section, and 3) a connection arrangement. The pipe holding section is configured so as to encircle at least a majority of the outer perimeter of the pipe. The pipe holding section is designed to fit at least partially about at least one pipe and to at least partially support the at least one pipe. The spacer section includes one or more spacer legs that are secured to the pipe holding section. The spacer section is designed to space the pipe holding section from a structure (e.g., wall, ceiling, floor, etc.). The connection arrangement is designed to facilitate in securing the spacer section to a structure.

In one non-limiting aspect of the invention, the pipe holding section is designed to enable an installer to fit the pipe holding section about a majority of the outer circumference of a portion of the pipe. For generally circular pipes, the pipe holding section is designed such that it encircles at least about 181° of the outer diameter of the pipe, typically at least about 190° of the outer diameter of the pipe, more typically at least about 200° of outer diameter of the pipe, even more typically at least about 250° of outer diameter of the pipe, still even more typically at least about 300° of outer diameter of the pipe, and yet still even more typically at least about 340° of outer diameter of the pipe. As can be appreciated, the pipe holding section can be designed such that it encircles the complete outer diameter of the pipe. The pipe holding section has an internal cavity that defines the region wherein the pipe is retained. This internal cavity can have many different cross-section shapes (e.g., circular, C-shaped, U-shaped, polygonal, etc.). The length of the cavity is non-limiting. Generally the length of the cavity is about 0.1-6 inches, and typically about 0.5-2 inches; however, other lengths can be used. The pipe holding section can be formed of a variety of different materials (e.g., metal, plastic, composite materials, etc.). Generally the pipe holding section is formed of a metal and/or plastic material. The pipe holding section can also be formed of a bendable or flexible material that facilitates in inserting one or more pipes in the internal cavity of the pipe holding section; however, this is not required. When the pipe holding section is formed of a bendable or flexible, plastic materials generally have a thickness of less than about 0.3 inch, and typically about 0.05-0.25 inch can be used; however, other thicknesses can be used. The plastic material can include one or more slots, depressions, etc. to facilitate in the bending and/or flexibility of the housing. Metal materials can also or alternatively be used for forming a bendable or flexible pipe holding section. Metals that can be used include tin, carbon steel, copper, aluminum etc. When metals are used, the metal generally has a thickness of less than about 0.3 inch, and typically about 0.01-0.2 inch can be used; however, other thicknesses can be used. The metal material can include one or more slots, depressions, etc. to facilitate in the bending and/or flexibility of the housing. The size of the internal cavity is non-limiting, thus can be designed to accommodate any pipe size. Typically the internal cavity is sized to hold a pipe having an outer diameter of about 0.25-6 inches; however, the internal cavity can be designed to fit other pipe sizes. The thickness of the holding section can be the same or different for different regions of the holding section. For example, one or more portions of the holding section can include a thinner portion (e.g., slotted section, etc.) to facilitate in the opening and/or closing of the holding section so as to facilitate in the insertion/removal of a pipe from the holding section.

In another and/or alternative non-limiting aspect of the invention, the pipe holding section can be formed of one component or be formed of two or more components that are connected together. When the pipe holding section is formed of two or more components, the components can be secured together in a variety of ways (e.g., hinge, adhesive, solder connection, weld bead, melted seam, clamp, nylon tie, etc.).

In still another and/or alternative non-limiting aspect of the invention, the internal cavity of the pipe holding section can include one or more pipe contacts that are designed to create a tight fit for the pipe and/or to reduce rotation, vibration and/or other types of movement of the pipe while in the internal cavity; however, this is not required. When one or more pipe contacts are included in the internal cavity, such pipe contacts can include, but are not limited to, fins, rubber material, foam, ribs, barbs, compressive materials, adhesive materials, etc.).

In still yet another and/or alternative non-limiting embodiment of the invention, the spacer section includes one or more legs that are designed to form a space between the pipe holding section and the connection arrangement. This space can be used to enable insulation to be easily and conveniently fitted about a pipe and the pipe holding section after a pipe has been secured to a structure by the improved spacer and clamp of the present invention. By suspending the pipe away from a structure to which it is secured, it becomes easy to install split seam foam insulation about the pipe after the pipe has been installed in a home or business. The improved spacer and clamp generally includes one or two spacer sections; however, more spacer sections can be used. At least one spacer section is connected between the pipe holding section and the connection arrangement. In one non-limiting embodiment of the present invention, at least one spacer has a generally straight or planar profile over at least a portion of the longitudinal length of the spacer; however, this is not required. The generally straight or planar profile on the spacer is designed to enable the spacer to fit in a slit in the insulation that is to be placed about the pipe and improve the spacer and clamp of the present invention. The size and shape of the spacer is generally selected so as to not be bulky, which bulkiness could interfere with the ease to which insulation, when used, is fitted about the pipe that is being supported by the pipe clamp. The length or height of the generally straight or planar profile on the spacer is non-limiting. Generally the height of the generally straight or planar profile on the spacer is at least as long as the thickness of insulation to be installed about the pipe. Generally the height of the generally straight or planar profile on the spacer is about 0.2-4 inches, and typically about 0.25-2 inches; however, other heights can be used. In another and/or additional non-limiting embodiment of the present invention, at least one spacer, when two or more spacers are included on the improved spacer and clamp of the present invention, one or more of the spacers can include a connection system to enable two or more of the spacers to be connected together; however, the inclusion of a connection system is not required. Non-limiting connection systems include tab-latch arrangements, Velcro connections, adhesive connections, clamp connections, clip arrangement, snap connections, bolt arrangement, screw arrangement, rivet arrangement, etc. When used, the connection system can facilitate in securing together two or more spacers. In still another and/or additional non-limiting embodiment of the present invention, at least one spacer, when two or more spacers are included on the improved spacer and clamp of the present invention, one or more of the spacers can include a connection system to enable one or more of the spacers to be connected to a connection arrangement and/or pipe holding section; however, the inclusion of a connection system is not required. Non-limiting connection systems include tab-latch arrangements, Velcro connections, adhesive connections, clamp connections, clip arrangements, snap connections, bolt arrangement, screw arrangement, rivet arrangement, etc.

In another and/or alternative non-limiting embodiment of the invention, the improved spacer and clamp of the present invention includes a connection arrangement that is designed to facilitate in the connection of the improved spacer and clamp to a structure (e.g., wall, ceiling, floor, beams, columns, poles, etc.). The connection arrangement can take many different forms. In one non-limiting embodiment of the invention, the connection arrangement includes one or more legs connected to one or more of the spacer sections. The one or more legs of the connection arrangement can be connected to the one or more spacer sections so as to form an angle of about 30-160°, typically about 45-135°, more typically about 60-120°, and even more typically about 75-105°; however, other angles can be used. In another and/or additional non-limiting embodiment of the invention, the connection arrangement can include one or more gripping members to facilitate in securing the connection arrangement to a structure; however, this is not required. Such gripping members can include, but are not limited to, barbs, ribs, dimples, non-smooth surfaces, adhesive, etc. In still another and/or additional non-limiting embodiment of the invention, the connection arrangement can include one or more connection openings to enable a screw, nail, bolt, etc. to facilitate in securing the connection arrangement to a structure; however, this is not required. In one non-limiting aspect of this embodiment, the one or more connection openings can pass generally perpendicularly through the legs of the connection arrangement or pass at some non-perpendicular angle through the legs (e.g., 30°-89°, etc.). When the one or more connection openings pass at some non-perpendicular angle through the legs, the legs can have a varying thickness along the longitudinal length of the legs; however, this is not required. In yet another and/or additional non-limiting embodiment of the invention, the connection arrangement can include one or more connectors that enable two or more legs of the connection arrangement to be connected together prior to or when the connection arrangement is connected to a structure; however, this is not required. In one non-limiting aspect of this embodiment, two or more legs of the connection arrangement include an connector such as, but not limited to, a tab-latch arrangement, Velcro connection, adhesive connection, clamp connection, clip arrangement, snap connection, bolt arrangement, screw arrangement, rivet arrangement, etc. In another and/or additional non-limiting aspect of this embodiment, two or more legs of the connection arrangement include one or more connection openings to enable a screw, nail, bolt, etc. to facilitate in securing the two legs together. In other non-limiting embodiment of the invention, the connection arrangement is able to be mounted to steel channel mounting systems known generically as Unistrut; however, this is not required.

In still another and/or alternative non-limiting embodiment of the invention, the improved spacer and clamp of the present invention can include color coding to identify use of the improved spacer and clamp with hot or cold pipes; however, this is not required. The color coding could be used wherever it is desirable to insulate pipes, whether it is to retain heat or to prevent condensation. Examples of such applications include use in the HVAC (Heating Ventilation and Air Conditioning) industry; industrial, commercial and medical piping systems used to convey liquids or gases, etc.

In still yet another and/or alternative non-limiting embodiment of the invention, there is provided an improved insulation system that can be used to facilitate in fitting the insulation over installed pipe. In one non-limiting embodiment of the invention, the insulation is in the form of a tubular foam material that includes a longitudinal slit to enable the insulation to be fitted over a pipe. One or both of the inside surfaces of the slit can include an adhesive material to facilitate in the connecting together of the slit surfaces; however, this is not required. The tubular foam material also includes one or more slots or cut-out regions that facilitate in forming elbow structures in the tubular foam material and/or to create a T-connection or cross connection for the tubular foam material.

One non-limiting object of the present invention is the provision of an improved spacer and clamp that simplifies the installation of pipe to a structure.

Another and/or additional non-limiting object of the present invention is the provision of an improved spacer and clamp that simplifies the installation of insulation about a pipe after the pipe has been connected to a structure.

Still another and/or additional non-limiting object of the present invention is the provision of an improved configurations for tubular insulation to be connected to pipe that has been connected to a structure.

These and other objects and advantages will become apparent to those skilled in the art upon the reading and following of this description taken together with the accompanying drawings.

BRIEF DESCRIPTION OF THE DRAWING

Reference may now be made to the drawings, which illustrates non-limiting embodiments of the present invention;

FIG. 1 is a side elevation view of a pipe that is connected to a building structure by the improved spacer and clamp in accordance with the present invention;

FIG. 2 is an end view of the improved spacer and clamp of FIG. 1;

FIG. 3 is a top partial cut away view of the improved spacer and clamp of FIG. 1;

FIG. 6 is an end view of the improved spacer and clamp of FIG. 1 which illustrates insulation about the pipe and the improved spacer and clamp;

FIG. 7 is a side elevation view of a pipe that is connected to a building structure by another improved spacer and clamp in accordance with the present invention;

FIG. 8 is a top partial cut away view of the improved spacer and clamp of FIG. 7;

FIG. 16 is a side elevation view of a pipe that is connected to a building structure by another improved spacer and clamp in accordance with the present invention;

FIG. 17 is an end view of the improved spacer and clamp of FIG. 16 wherein the improved spacer and clamp is in an open position;

FIG. 18 is an end view of the improved spacer and clamp of FIG. 16;

FIG. 19 is a side elevation view of a pipe that is connected to a building structure by another improved spacer and clamp in accordance with the present invention;

FIG. 20 is an end view of the improved spacer and clamp of FIG. 19 wherein the improved spacer and clamp is in an open position;

FIG. 21 is an end view of the improved spacer and clamp of FIG. 19;

FIG. 33 is an enlarged end view of the improved spacer and clamp of FIG. 31 that does not include the pipe inserted in the pipe holding section;

FIG. 34 is an enlarged side view of the improved spacer and clamp of FIG. 31; and, FIGS. 35-41 illustrate tubular pipe insulation that can be used to insulate pipe.

DETAILED DESCRIPTION OF THE INVENTION

Figure 4:
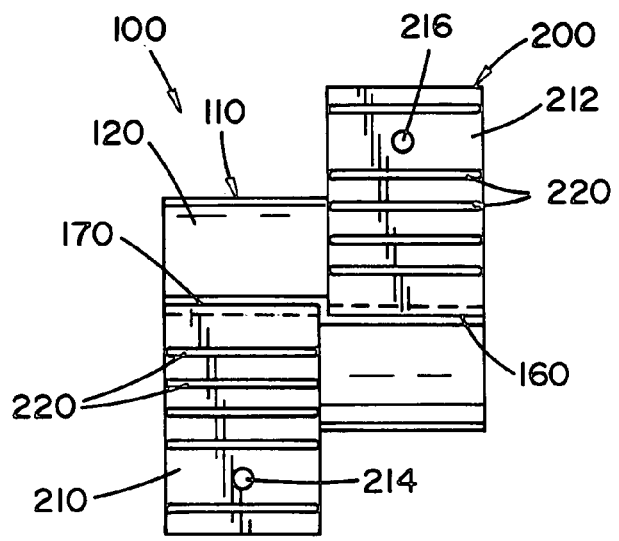
FIG. 4 is a bottom view of the improved spacer and clamp of FIG. 1.

Referring now to FIGS. 1-34, which illustrate several non-limiting embodiments of the present invention, there is provided an improved spacer and clamp that can be used to easily and conveniently secure pipe to various structures. The improved spacer and clamp can be used with many types of pipe (e.g., copper pipe, PVC pipe, iron pipe, stainless steel pipe, rubber pipe, vinyl pipe, etc.). Although the improved spacer and clamp will be described with particular reference for use with pipes, it will be appreciated that the improved spacer and clamp can be used with items other than pipes and/or in conjunction with pipes (e.g., electric cables/wires, audio/visual cables/wires, computer/network cables/wires, telephone cables/wires, television cables/wires, rope, cords, chains, cables, etc.).

Referring now to FIGS. 1-6, there are illustrated various views of one non-limiting embodiment of the invention. The improved spacer and clamp 100 includes three basic components, namely 1) a pipe holding section 110, 2) a spacer section 150, and 3) a connection arrangement 200. The materials used to form the improved spacer and clamp 100 is non-limiting. Generally, the improved spacer and clamp 100 is made of a plastic and/or metal material. The pipe holding section 110, the spacer section 150 and connection arrangement 200 can be formed of the same or different materials. The improved spacer and clamp 100 can be formed from a single piece of material or be formed from multiple pieces of materials that can be secured and/or connected together. The size of the improved spacer and clamp 100 is also non-limiting. The improved spacer and clamp 100 can be made in a variety of ways such as, but not limited to, molding, stamping, cutting, casting, etc.

As illustrated in FIG. 1, the connection arrangement 200 is secured to a building structure B such as a wood column or beam in a wall, floor or ceiling. The connection arrangement includes two legs 210, 212. Each of the legs 210, 212 include a connection opening 214, 216, respectively that is designed to receive a screw 250 or some other connection element (e.g, nail, bolt, rivet, etc.) to secure each leg to building structure B. As can be appreciated, one or both legs do not require a preformed connection opening. In such an arrangement, an installer could drive a nail, screw, etc. through the legs to form a connection opening during the connection of the legs to a structure. As can be appreciated, one or both legs can include marks or pop-out regions that facilitate in locating a region on the legs to insert the connection element and/or to form the connection opening in the legs. As can be appreciated, the legs can be connected by other or additional arrangements (e.g., adhesive, clamp, etc). As can also be appreciated, the legs can include more than one connection opening for use with more than one connector. As illustrated in FIGS. 1, 2 and 4, the base of the legs 210, 212 includes a gripping arrangement in the form of a plurality of ribs 220. The ribs 220 can be used to facilitate in providing a grip surface to the base of the legs during and/or after connecting the legs to the building structure B. As can be appreciated, the use of a gripping arrangement is not required on one or both legs. As can also be appreciated, when a gripping arrangement is used, gripping arrangements other than or in addition to ribs can be used (e.g., barbs, adhesive, etc.).

The spacer section 150 is formed by two spacer flanges 160, 170 that lie in a longitudinal axis PL1. The spacer flanges are illustrated as having the same width and height; however, this is not required. The spacer flanges are illustrated as having a uniform thickness along the height of the spacer flanges; however, this is not required. Each of the spacer flanges are connected to a leg of the connection arrangement. The spacer flanges are illustrated as being connected to the end of a leg of the connection arrangement; however, it can be appreciated that one or both spacer flanges can be connected to other regions of the leg of the connection arrangement. The spacer flanges are illustrated as being connected to the leg of the connection arrangement at about a 90° angle; however, it can be appreciated that one or both spacer flanges can be connected to the leg of the connection arrangement at other angles. The height of the spacer flanges is non-limiting; however, the height is generally selected so that tubular insulation I can be inserted about pipe P as illustrated in FIG. 6. Generally, the height of spacer flanges 160, 170 is at least about 0.25, and typically about 0.5-2 inches; however, other heights can be used. As best illustrated in FIGS. 1, 3 and 4, the spacer flanges 160, 170 are spaced apart from one another along the longitudinal axis PL2. The spacer flanges are also illustrated as being positioned edge to edge from one another when the spacer and clamp 100 is connected to the building structure B as illustrated in FIG. 1. As can be appreciated, the spacer flanges do not have to be positioned edge to edge from one another when the spacer and clamp 100 is connected to the building structure B, thus the spacer and clamp 100 can be designed such that a space or gap exists between the spacer flanges when the spacer and clamp 100 is connected to the building structure B.

Figure 5:
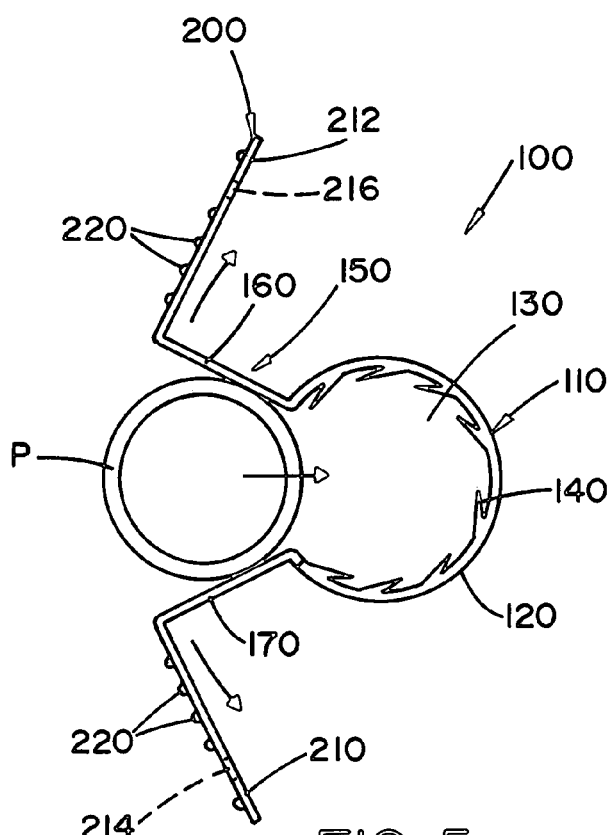
FIG. 5 is an end view of the improved spacer and clamp of FIG. 1 which illustrates a pipe being inserted into the pipe holding section.

The pipe holding section 110 is illustrated as having a tubular housing 120 having a longitudinal axis PL2 and that has a generally circular cross-sectional shape as best illustrated in FIGS. 1, 2, and 6. As illustrated in FIG. 2, the longitudinal axis of spacer flanges 150, 160 is perpendicular to the longitudinal axis PL2 of the tubular housing 130. As can be appreciated, the cross-sectional shape of housing 120 can be a shape other than circular. The housing 120 forms an inner cavity 130 at least when the spacer and clamp 100 is connected to the building structure B as illustrated in FIG. 1. The inner cavity 130 is illustrated as having a generally circular cross-sectional shape to accommodate standard shaped pipe P; however, it will be appreciated that the cross-sectional shape of cavity 130 can be other than circular. The inner surface of housing 120 can include one or more gripping elements; however, this is not required. As illustrated in FIGS. 2 and 5, the inner surface of housing 120 includes gripping elements in the form of barbs 140; however, it will be appreciated that other or additional types of gripping elements can be used. The housing 120 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 120 can be formed of two components and connected together by a rotating, pivoting or flexible hinge, not shown. If some type of hinge is used, the hinge is generally located at the opposite side of the housing from the location where the spacer legs are connected to the housing; however, this is not required.

The assembly of an insulated pipe P using the spacer and clamp 100 will now be briefly described. As illustrated in FIG. 5, pipe holding section 110 is formed of a bendable and/or flexible material that enables a pipe P to be inserted into the cavity 130 of housing 120. FIG. 5 illustrates that the legs 212, 214 are pulled back so that pipe P can be slipped into cavity 130. As can be appreciated, one of the legs can be secured to building structure B and then one leg can be pulled back to slip the pipe into the cavity 130. Once the pipe is positioned in cavity 130, one or both legs are then secured to building structure B by screws 250 as illustrated in FIG. 1. The legs may have to be bent together to snugly fit the pipe in the cavity 130; however, this may not be required. The gripping members 140, when used, hold the pipe in position in the cavity 130 of housing 120 so as to inhibit or prevent vibration, rotation and/or other types of movement of the pipe in the cavity. Once the legs are secured to the building structure via screws 250 through connection openings 214, 216, insulation I as illustrated in FIG. 6, can be placed about the pipe and spacer and clamp 100. Insulation I is typically a foam material that includes a longitudinal slit S. When installing the insulation, the edges of slit S are pulled apart thereby enabling the insulation to be fit about the pipe. Since the pipe is mounted at a spaced distance from the building structure, the insulation can be easily and conveniently placed about the complete outer perimeter of the pipe. The insulation can also be placed completely or nearly completely about housing 120 as illustrated in FIG. 6. The spacer flanges 160, 170 are designed to extend generally parallel to the inside faces of slit S of the insulation. As such, the insulation conforms to the housing and the slit faces engage the space flanges thereby allowing for easy and convenient installation of the insulation about the spacer and clamp 100. When the faces of the slit S include an adhesive, or an adhesive is applied to the slit face, the slit faces can be then secured to the spacer flanges 160, 170; however, this is not required. As can be appreciated, the insulation can be inserted about the pipe and spacer and clamp prior to being secured to the building structure.

Referring now to FIGS. 7 and 8, another improved spacer and clamp 300 is disclosed. The improved spacer and clamp 300 includes three basic components, namely 1) a pipe holding section 310, 2) a spacer section 350, and 3) a connection arrangement 400. The materials used to form the improved spacer and clamp 300 are non-limiting. Generally, the improved spacer and clamp 300 is made of a plastic and/or metal material. The pipe holding section 310, the spacer section 350 and connection arrangement 400 can be formed of the same or different materials. The improved spacer and clamp 300 can be formed from a single piece of material or be formed from multiple pieces of materials that can be secured and/or connected together. The size of the improved spacer and clamp 300 is also non-limiting. The improved spacer and clamp 300 can be made in a variety of ways such as, but not limited to, molding, stamping, cutting, casting, etc.

As illustrated in FIG. 7, the connection arrangement 400 is secured to a building structure B such as a wood column or beam in a wall, floor or ceiling. The connection arrangement includes two legs 410, 412. Each of the legs 410, 412 include a connection opening 414, 416, respectively, that is designed to receive a screw 450 or some other connection element (e.g., nail, bolt, rivet, etc.) to secure each leg to building structure B. As can be appreciated, one or both legs do not require a preformed connection opening. In such an arrangement, an installer could drive a nail, screw, etc. through the legs to form a connection opening during the connection of the legs to a structure. As can also be appreciated, one or both legs can include marks or pop-out regions that facilitate in locating a region on the legs to insert the connection element and/or to form the connection opening in the legs. As can be appreciated, the legs can be connected by other or additional arrangements (e.g., adhesive, clamp, etc.). As can also be appreciated, the legs can include more than one connection opening for use with more than one connector. The base of the legs 410, 412 can include a gripping arrangement, not shown.

The spacer section 350 is formed by two spacer flanges 360, 370. The spacer flanges are illustrated as having the same width and height; however, this is not required. The spacer flanges are illustrated as having a uniform thickness along the height of the spacer flanges; however, this is not required. Each of the spacer flanges are connected to a leg of the connection arrangement. The spacer flanges are illustrated as being connected to the end of a leg of the connection arrangement; however, it can be appreciated that one or both spacer flanges can be connected to other regions of the leg of the connection arrangement. The spacer flanges are illustrated as being connected to the leg of the connection arrangement at about a 90° angle; however, it can be appreciated that one or both spacer flanges can be connected to the leg of the connection arrangement at other angles. The height of the spacer flanges is non-limiting; however, the height is generally selected so that a tubular insulation, not shown, can be inserted about pipe P. Generally, the height of spacer flanges 360, 370 is at least about 0.25, and typically about 0.5-2 inches; however, other heights can be used. As best illustrated in FIG. 7, the spacer flanges 360, 370 face one another when secured to a building structure and are spaced in generally the same location along the longitudinal axis of the spacer and clamp 300. As can be appreciated, the spacer flanges do not have to be positioned directly opposite from one another when the spacer and clamp 300 is connected to the building structure B, thus the spacer and clamp 300 can be designed such that the legs are off-set from one another when the spacer and clamp 300 is connected to the building structure B. The spacer flanges include at least one connection opening 2262, 2272 that is designed to enable a connector 2250 to connect together the spacer flanges. The connector 2250 is illustrated as being a threaded bolt; however, other types of connectors can be used (e.g., screw, bolt and nut, rivet, etc.). As can be appreciated, the spacer flanges can be connected together by one or more connection arrangements (e.g., adhesive, weld, solder, clamp, lock tab, screw, bolt and nut, rivet, etc.).

The pipe holding section 310 is illustrated as having a tubular housing 320 that has a generally circular cross-sectional shape as best illustrated in FIG. 7. As can be appreciated, the cross-sectional shape of housing 320 can be a shape other than circular. The housing 320 forms an inner cavity 330 at least when the spacer and clamp 300 is connected to the building structure B as illustrated in FIG. 7. The inner cavity 330 is illustrated as having a generally circular cross-sectional shape to accommodate standard shaped pipe P; however, it will be appreciated that the cross-sectional shape of cavity 330 can be other than circular. The inner surface of housing 320 can include one or more gripping elements, not shown; however, this is not required. The housing 320 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 320 can be formed of two components and connected together by a rotating, pivoting or flexible hinge, not shown. If some type of hinge is used, the hinge is generally located at the opposite side of the housing from the location where the spacer legs are connected to the housing; however, this is not required.

The assembly of an insulated pipe P using the spacer and clamp 300 will now be briefly described. Pipe holding section 310 is formed of a bendable and/or flexible material that enables a pipe P to be inserted into the cavity 330 of housing 320. The legs 410, 412 are pulled back so that pipe P can be slipped into cavity 330. As can be appreciated, one of the legs can be secured to building structure B and then one leg can be pulled back to slip the pipe into the cavity 330. Once the pipe is positioned in cavity 330, one or both legs are then secured to building structure B by screws 450 as illustrated in FIG. 7. The legs may have to be bent together to snugly fit the pipe in the cavity 330; however, this may not be required. Gripping members, when used, hold the pipe in position in the cavity 330 of housing 320 so as to inhibit or prevent vibration, rotation and/or other types of movement of the pipe in the cavity. Once the legs are secured to the building structure via screws 450 through connection openings 414, 416, insulation, not shown, can be placed about the pipe and spacer and clamp 300. The insulation, when used, is typically a foam material that includes a longitudinal slit. When installing the insulation, the edges of the slit are pulled apart thereby enabling the insulation to be fit about the pipe. Since the pipe is mounted at a spaced distance from the building structure, the insulation can be easily and conveniently placed about the complete outer perimeter of the pipe. The insulation can also be placed completely or nearly completely about housing 320. The spacer flanges 360, 370 are designed to extend generally parallel to the inside faces or slit of the insulation. As such, the insulation conforms to the housing and the slit faces engage the space flanges thereby allowing for easy and convenient installation of the insulation about the spacer and clamp 300. When the faces of the slit include an adhesive or an adhesive is applied to the slit face, the slit faces can be then secured to the spacer flanges 360, 370; however, this is not required. As can be appreciated, the insulation can be inserted about the pipe and spacer and clamp prior to being secured to the building structure.

Figure 9:
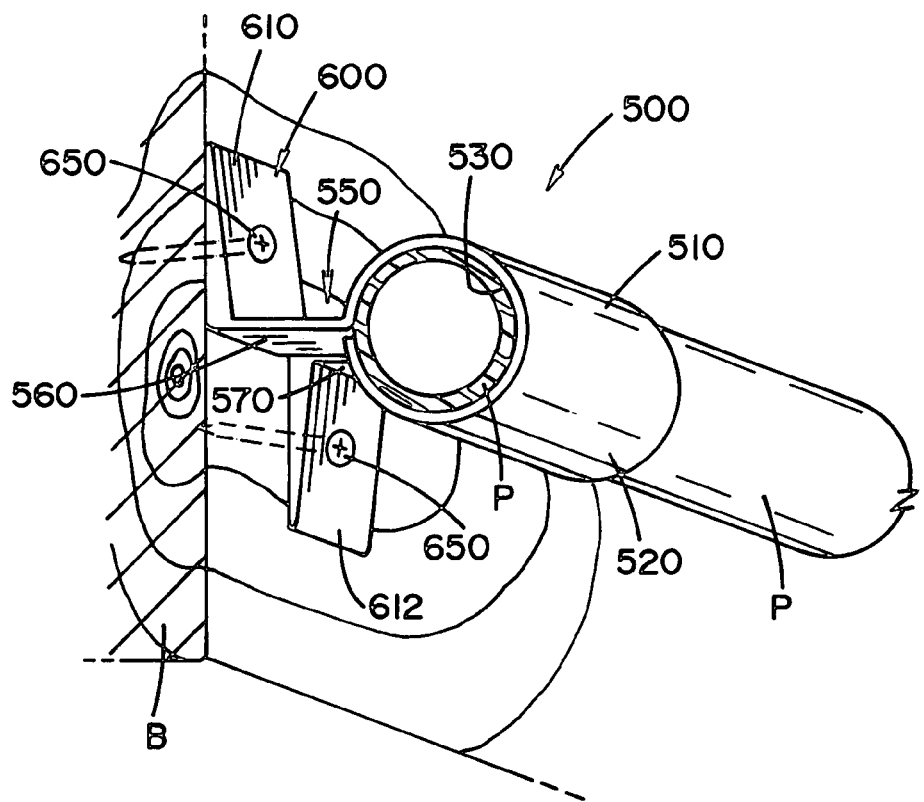
FIG. 9 is a side elevation view of a pipe that is connected to a building structure by another improved spacer and clamp in accordance with the present invention.
Figure 10:
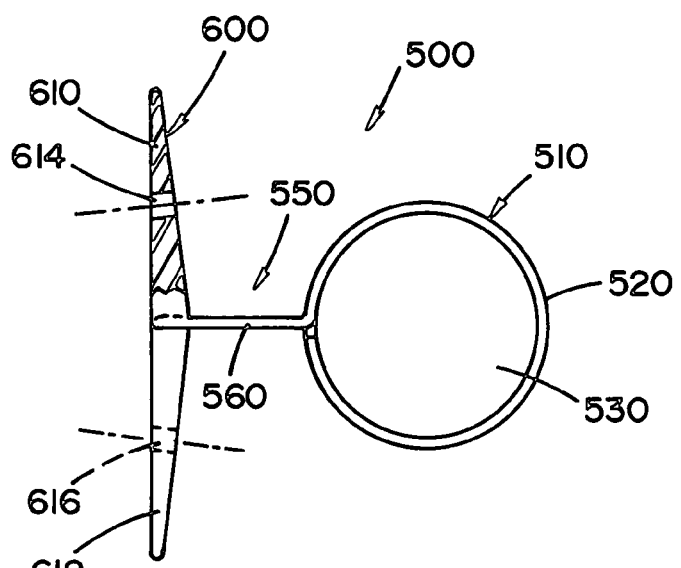
FIG. 10 is an end view of the improved spacer and clamp of FIG. 9.

Referring now to FIGS. 9 and 10, another improved spacer and clamp 500 is disclosed. The improved spacer and clamp 500 includes three basic components, namely 1) a pipe holding section 510, 2) a spacer section 550, and 3) a connection arrangement 600. The materials used to form the improved spacer and clamp 500 are non-limiting. Generally, the improved spacer and clamp 500 is made of a plastic and/or metal material. The pipe holding section 510, the spacer section 550 and the connection arrangement 600 can be formed of the same or different materials. The improved spacer and clamp 500 can be formed from a single piece of material or be formed from multiple pieces of materials that can be secured and/or connected together. The size of the improved spacer and clamp 500 is also non-limiting. The improved spacer and clamp 500 can be made in a variety of ways such as, but not limited to, molding, stamping, cutting, casting, etc.

As illustrated in FIG. 9, the connection arrangement 600 is secured to a building structure B such as a wood column or beam in a wall, floor or ceiling. The connection arrangement includes two legs 610, 612. Each of the legs 610, 612 include a connection opening 614, 616, respectively that is designed to receive a screw 650 or some other connection element (e.g., nail, bolt, rivet, etc.) to secure each leg to building structure B. As can be appreciated, one or both legs do not require a preformed connection opening. In such an arrangement, an installer could drive a nail, screw, etc. through the legs to form a connection opening during the connection of the legs to a structure. As can also be appreciated, one or both legs can include marks or pop-out regions that facilitate is locating a region on the legs to insert the connection element and/or to form the connection opening in the legs. The connection openings in both of the legs are formed at some non-normal angle relative to the plane of the base of the legs. Generally, the angle of the connection openings relative to the plane of the base of the legs is about 45°-89°, and typically about 70°-90°; however, it will be appreciated that other angles can be used. The angle of the two connection openings relative to the plane of the base legs can be the same or different. It can be appreciated that one of the connection openings can be generally normal to the base of a leg and the other connection opening being non-normal to the base of a leg. The thickness of the legs 610, 612 are illustrated as being tapered. As can be appreciated, tapering of one or both legs is not required. As can also be appreciated, one leg can be tapered and one leg not be tapered. The angle of taper for each leg can be the same or different. Generally the angle of taper is about 1°-45°, and typically about 5°-15°; however, it will be appreciated that other taper angles can be used. As can be appreciated, the legs can be connected by other or additional arrangements (e.g., adhesive, clamp, etc). As can also be appreciated, the legs can include more than one connection opening for use with more than one connector. The base of the legs 610, 612 can include a gripping arrangement, not shown.

The spacer section 550 is formed by two spacer flanges 560, 570. The spacer flanges are illustrated as having the same width and height; however, this is not required. The spacer flanges are illustrated as having a uniform thickness along the height of the spacer flanges; however, this is not required. Each of the spacer flanges are connected to a leg of the connection arrangement. The spacer flanges are illustrated as being connected to the end of a leg of the connection arrangement; however, it can be appreciated that one or both spacer flanges can be connected to other regions of the leg of the connection arrangement. The spacer flanges are illustrated as being connected to the leg of the connection arrangement at about a 90° angle; however, it can be appreciated that one or both spacer flanges can be connected to the leg of the connection arrangement at other angles. The height or amount of standoff of the spacer flanges is non-limiting; however, the height is generally selected so that a tubular insulation, not shown, can be inserted about pipe P. Generally, the height of spacer flanges 560, 570 is at least about 0.25, and typically about 0.5-2 inches; however, other heights can be used. As best illustrated in FIG. 9, the spacer flanges 560, 570 are spaced apart from one another along the longitudinal axis. The spacer flanges are also illustrated as being positioned edge to edge from one another when the spacer and clamp 500 is connected to the building structure B as illustrated in FIG. 9. As can be appreciated, the spacer flanges do not have to be positioned edge to edge from one another when the spacer and clamp 500 is connected to the building structure B, thus the spacer and clamp 500 can be designed such that a space or gap exists between the spacer flanges when the spacer and clamp 500 is connected to the building structure B. Although not shown, the spacer flange arrangement disclosed in FIGS. 9 and 10 can be modified to more resemble the spacer flange orientation disclosed in FIG. 7 as described above. In such a spacer flange orientation, the spacer flanges 560, 570 would face one another when secured to a building structure and are spaced in generally the same location along the longitudinal axis of the spacer and clamp 500. As can be appreciated, the spacer flanges do not have to be positioned directly opposite from one another when the spacer and clamp 500 is connected to the building structure B, thus the spacer and clamp 500 can be designed such that the legs are off-set from one another when the spacer and clamp 500 is connected to the building structure B.

The pipe holding section 510 is illustrated as having a tubular housing 520 that has a generally circular cross-sectional shape as best illustrated in FIGS. 9 and 10. As can be appreciated, the cross-sectional shape of housing 520 can be a shape other than circular. The housing 520 forms an inner cavity 530 at least when the spacer and clamp 500 is connected to the building structure B as illustrated in FIG. 9. The inner cavity 530 is illustrated as having a generally circular cross-sectional shape to accommodate standard shaped pipe P; however, it will be appreciated that the cross-sectional shape of cavity 530 can be other than circular. The inner surface of housing 520 can include one or more gripping elements, not shown; however, this is not required. The housing 520 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 520 can be formed of two components and connected together by a rotating, pivoting or flexible hinge, not shown. If some type of hinge is used, the hinge is generally located at the opposite side of the housing from the location where the spacer legs are connected to the housing; however, this is not required.

The assembly of an insulated pipe P using the spacer and clamp 500 will now be briefly described. Pipe holding section 510 is formed of a bendable and/or flexible material that enables a pipe P to be inserted into the cavity 530 of housing 520. The legs 610, 612 are pulled back so that pipe P can be slipped into cavity 530. As can be appreciated, one of the legs can be secured to building structure B and then one leg can be pulled back to slip the pipe into the cavity 530. Once the pipe is positioned in cavity 530, one or both legs are then secured to building structure B by screws 650 as illustrated in FIG. 9. The legs may have to be bent together to snugly fit the pipe in the cavity 530; however, this may not be required. Gripping members, when used, hold the pipe in position in the cavity 530 of housing 520 so as to inhibit or prevent vibration, rotation and/or other types of movement of the pipe in the cavity. The angled connection openings are angled toward the spacer flanges thereby facilitating in causing the housing 520 to tighten about the pipe as the screws are inserted into the building structure; however, this is not required. Once the legs are secured to the building structure via screws 650 through connection openings 614, 616, insulation, not shown, can be placed about the pipe and spacer and clamp 500. The insulation, when used, is typically a foam material that includes a longitudinal slit. When installing the insulation, the edges of the slit are pulled apart thereby enabling the insulation to be fit about the pipe. Since the pipe is mounted at a spaced distance from the building structure, the insulation can be easily and convenient place about the complete outer perimeter of the pipe. The insulation can also be placed completely or nearly completely about housing 520. The spacer flanges 560, 570 are designed to extend generally parallel to the inside faces or slit of the insulation. As such, the insulation conforms to the housing and the slit faces engage the space flanges thereby allowing for easy and convenient installation of the insulation about the spacer and clamp 500. When the faces of the slit include an adhesive or an adhesive is applied to the slit face, the slit faces can be then secured to the spacer flanges 560, 570; however, this is not required. As can be appreciated, the insulation can be inserted about the pipe and spacer and clamp prior to being secured to the building structure.

Figure 11:
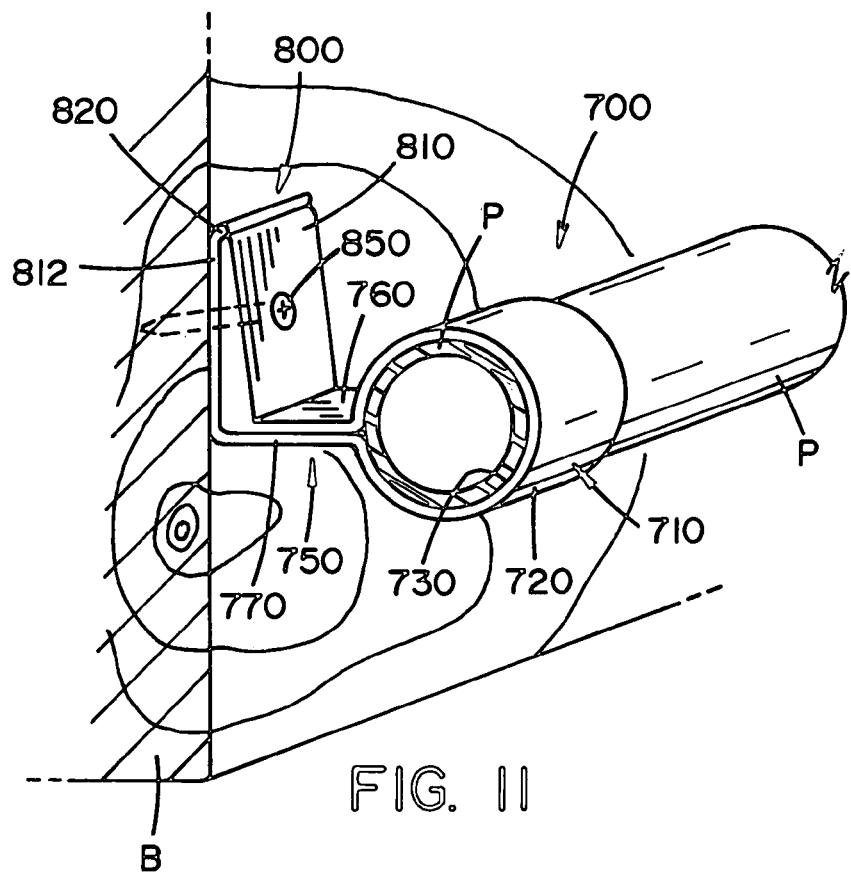
FIG. 11 is a side elevation view of a pipe that is connected to a building structure by another improved spacer and clamp in accordance with the present invention.
Figure 12:
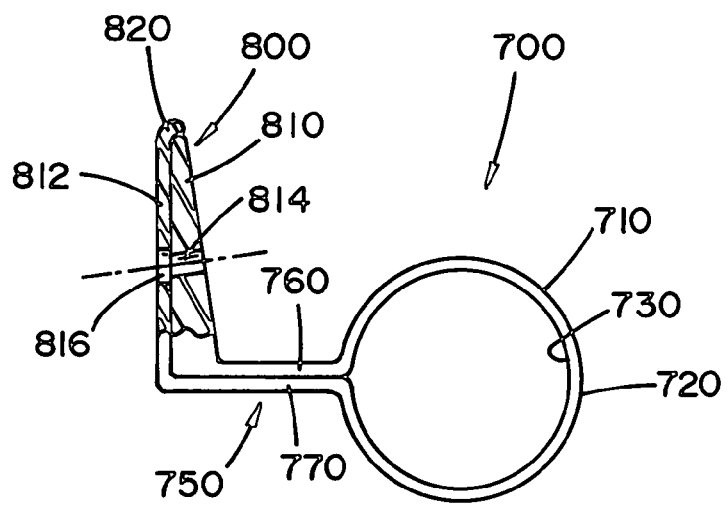
FIG. 12 is an end view of the improved spacer and clamp of FIG. 11.

Referring now to FIGS. 11 and 12, another improved spacer and clamp 700 is disclosed. The improved spacer and clamp 700 includes three basic components, namely 1) a pipe holding section 710, 2) a spacer section 750, and 3) a connection arrangement 800. The materials used to form the improved spacer and clamp 700 are non-limiting. Generally the improved spacer and clamp 700 is made of a plastic and/or metal material. The pipe holding section 710, the spacer section 750 and the connection arrangement 800 can be formed of the same or different materials. The improved spacer and clamp 700 can be formed from a single piece of material or be formed from multiple pieces of material that can be secured and/or connected together. The size of the improved spacer and clamp 700 is also non-limiting. The improved spacer and clamp 700 can be made in a variety of ways such as, but not limited to, molding, stamping, cutting, casting, etc.

As illustrated in FIG. 11, the connection arrangement 800 is secured to a building structure B such as a wood column or beam in a wall, floor or ceiling. The connection arrangement includes two legs 810, 812. Each of the legs 810, 812 include a connection opening 814, 816, respectively that is designed to receive a screw 850 or some other connection element (e.g, nail, bolt, rivet, etc.) to secure each leg to building structure B. As can be appreciated, one or both legs do not require a preformed connection opening. In such an arrangement, an installer could drive a nail, screw, etc. through the legs to form a connection opening during the connection of the legs to a structure. As can also be appreciated, one or both legs can include marks or pop-out regions that facilitate in locating a region on the legs to insert the connection element and/or to form the connection opening in the legs. The connection opening in at least one of the legs is formed at some non-normal angle relative to the plane of the base of the legs. Generally the angle of the connection opening relative to the plane of the base of the legs is about 45°-89°, and typically about 70°-90°; however, it will be appreciated that other angles can be used. The angle of both of the connection openings, when both connection openings are angled, relative to the plane of the base, legs can be the same or different. It can be appreciated that one of the connection openings can be generally normal to the base of a leg and the other connection opening being non-normal to the base of a leg as illustrated by connection opening 816 in FIG. 12. The thickness of the leg 810 is illustrated as being tapered, and the thickness of leg 812 as being generally constant. As can be appreciated, tapering of one of the legs is not required. As can also be appreciated, both legs can be tapered. The angle of taper for leg 810 is about 1°-45°, and typically about 5°-15°; however, it will be appreciated that other taper angles can be used. As can be appreciated, the legs can be connected by other or additional arrangements (e.g., adhesive, clamp, etc). As can also be appreciated, the legs can include more than one connection opening for use with more than one connector. The base of the legs 810, 812 can include a gripping arrangement, not shown. The end of leg 812 includes a lip 820 that is designed to facilitate in maintaining leg 810 in position on top of leg 812 so that connection openings 814 and 816 are generally aligned with one another as illustrated in FIG. 12. Lip 820 can be designed such that leg 810 snaps into position on leg 810; however, this is not required.

The spacer section 750 is formed by two spacer flanges 760, 770. The spacer flanges are illustrated as having the same width; however, this is not required. The spacer flanges are illustrated as having a uniform thickness along the height of the spacer flanges; however, this is not required. The height of the two spacer flanges are different. Each of the spacer flanges are connected to a leg of the connection arrangement. The spacer flanges are illustrated as being connected to the end of a leg of the connection arrangement; however, it can be appreciated that one or both spacer flanges can be connected to other regions of the leg of the connection arrangement. The spacer flanges are illustrated as being connected to the leg of the connection arrangement at about a 90° angle; however, it can be appreciated that one or both spacer flanges can be connected to the leg of the connection arrangement at other angles. The height of the spacer flanges is non-limiting; however, the height is generally selected so that a tubular insulation, not shown, can be inserted about pipe P. Generally, the height of spacer flanges 760, 770 is at least about 0.25, and typically about 0.5-2 inches; however, other heights can be used. As best illustrated in FIG. 11, the spacer flanges 760, 770 face one another when secured to a building structure and are spaced in generally the same location along the longitudinal axis of the spacer and clamp 700. As can be appreciated, the spacer flanges do not have to be positioned directly opposite from one another when the spacer and clamp 700 is connected to the building structure B, thus the spacer and clamp 700 can be designed such that the legs are off-set from one another when the spacer and clamp 700 is connected to the building structure B. As can be appreciated, the spacer flanges can be connected together by one or more connection arrangement (e.g., screw, bolt and nut, rivet, adhesive, weld, solder, clamp, lock tab, etc).

The pipe holding section 710 is illustrated as having a tubular housing 720 that has a generally circular cross-sectional shape as best illustrated in FIGS. 11 and 12. As can be appreciated, the cross-sectional shape of housing 720 can be a shape other than circular. The housing 720 forms an inner cavity 730 at least when the spacer and clamp 700 is connected to the building structure B as illustrated in FIG. 11. The inner cavity 730 is illustrated as having a generally circular cross-sectional shape to accommodate standard shaped pipe P; however, it will be appreciated that the cross-sectional shape of cavity 730 can be other than circular. The inner surface of housing 720 can include one or more gripping elements, not shown; however, this is not required. The housing 720 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 720 can be formed of two components and connected together by a rotating, pivoting or flexible hinge, not shown. If some type of hinge is used, the hinge is generally located at the opposite side of the housing from the location where the spacer legs are connected to the housing; however, this is not required.

The assembly of an insulated pipe P using the spacer and clamp 700 will now be briefly described. Pipe holding section 710 is formed of a bendable and/or flexible material that enables a pipe P to be inserted into the cavity 730 of housing 720. The legs 810, 812 are pulled back so that pipe P can be slipped into cavity 730. Once the pipe is positioned in cavity 730, leg 810 is snapped over leg 812 and held in position by lip 820. In this position, the two connection openings 814, 816 are aligned with one another. The legs are then secured to building structure B by screw 850 as illustrated in FIG. 11. Gripping members, when used, hold the pipe in position in the cavity 730 of housing 720 so as to inhibit or prevent vibration, rotation and/or other types of movement of the pipe in the cavity. The angled connection opening 814 is angled toward the spacer flanges thereby facilitating in causing the housing 720 to tighten about the pipe and maintaining leg 810 on leg 812 as the screw is inserted into the building structure; however, this is not required. Once the legs are secured to the building structure via screw 850 through connection openings 814, 816, insulation, not shown, can be placed about the pipe and spacer and clamp 700. The insulation, when used, is typically a foam material that includes a longitudinal slit. When installing the insulation, the edges of the slit are pulled apart thereby enabling the insulation to be fitted about the pipe. Since the pipe is mounted at a spaced distance from the building structure, the insulation can be easily and conveniently placed about the complete outer perimeter of the pipe. The insulation can also be placed completely or nearly completely about housing 720. The spacer flanges 760, 770 are designed to extend generally parallel to the inside faces of the slit of the insulation. As such, the insulation conforms to the housing and the slit faces engage the space flanges thereby allowing for easy and convenient installation of the insulation about the spacer and clamp 700. When the faces of the slit include an adhesive or an adhesive is applied to the slit face, the slit faces can be then secured to the spacer flanges 760, 770; however, this is not required. As can be appreciated, the insulation can be inserted about the pipe and spacer and clamp prior to being secured to the building structure.

Figure 13:
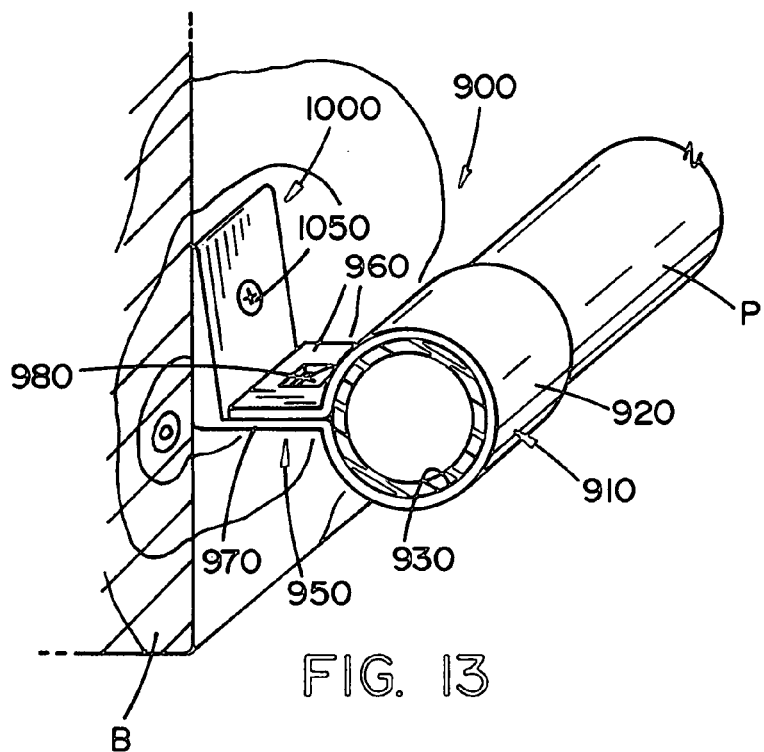
FIG. 13 is a side elevation view of a pipe that is connected to a building structure by another improved spacer and clamp in accordance with the present invention.
Figure 14:
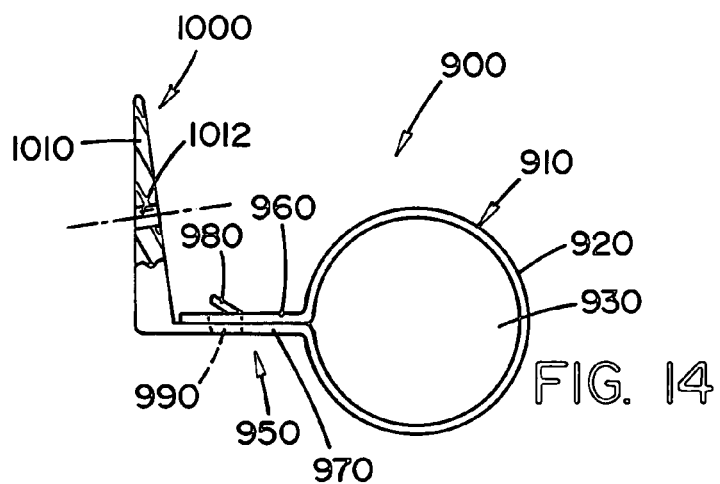
FIG. 14 is an end view of the improved spacer and clamp of FIG. 13.
Figure 15:
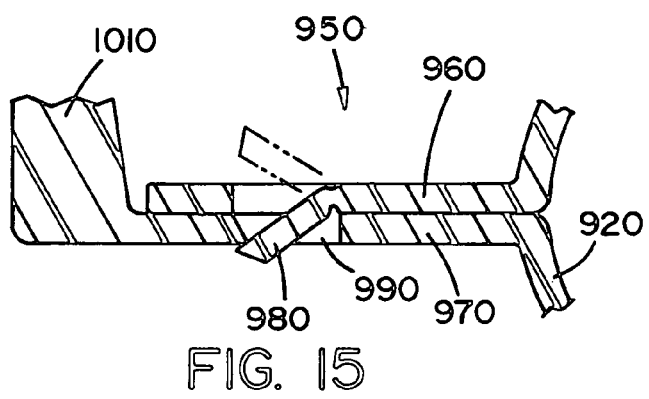
FIG. 15 is an enlarged view of the spacer section of the improved spacer and clamp of FIG. 13 which illustrates a connection arrangement on the spacer section.

Referring now to FIGS. 13-15, another improved spacer and clamp 900 is disclosed. The improved spacer and clamp 900 includes three basic components, namely 1) a pipe holding section 910, 2) a spacer section 950, and 3) a connection arrangement 1000. The materials used to form the improved spacer and clamp 900 are non-limiting. Generally the improved spacer and clamp 900 is made of a plastic and/or metal material. The pipe holding section 910, the spacer section 950 and the connection arrangement 1000 can be formed of the same or different materials. The improved spacer and clamp 900 can be formed from a single piece of material or be formed from multiple pieces of materials that can be secured and/or connected together. The size of the improved spacer and clamp 900 is also non-limiting. The improved spacer and clamp 900 can be made in a variety of ways such as, but not limited to, molding, stamping, cutting, casting, etc.

As illustrated in FIG. 13, the connection arrangement 1000 is secured to a building structure B such as a wood column or beam in a wall, floor or ceiling. The connection arrangement includes one leg 1010; however, it can be appreciated that the connection arrangement can include more than one leg. Leg 1010 includes a connection opening 1012 that is designed to receive a screw 1050 or some other connection element (e.g, nail, bolt, rivet, etc.) to secure each leg to building structure B. As can be appreciated, the leg does not require a preformed connection opening. In such an arrangement, an installer could drive a nail, screw, etc. through the leg to form a connection opening during the connection of the leg to a structure. As can also be appreciated, the leg can include a mark or pop-out region that facilitates in locating a region on the leg to insert the connection element and/or to form the connection opening in the leg. The connection opening in the leg is formed at some non-normal angle relative to the plane of the base of the leg. Generally, the angle of the connection opening relative to the plane of the base of the leg is about 45°-89°, and typically about 70°-90°; however, it will be appreciated that other angles can be used. It can be appreciated that the connection opening can be generally normal to the base of a leg. The thickness of the leg 1010 is illustrated as being tapered. As can be appreciated, tapering of the leg is not required. The angle of taper for leg 1010 is about 1°-45°, and typically about 5°-15°; however, it will be appreciated that other taper angles can be used. As can be appreciated, the legs leg can be connected by other or additional arrangements (e.g., adhesive, clamp, etc). As can also be appreciated, the kg can include more than one connection opening for use with more than one connector. The base of 1010 can include a gripping arrangement, not shown.

The spacer section 950 is formed by two spacer flanges 960, 970. The spacer flanges are illustrated as having the same width; however, this is not required. The spacer flanges are illustrated as having a uniform thickness along the height of the spacer flanges; however, this is not required. The height of the two spacer flanges are different. Spacer flange 970 is connected to leg 1010 of the connection arrangement. The spacer flange is illustrated as being connected to the end of a leg of the connection arrangement; however, it can be appreciated that the spacer flange can be connected to other regions of the leg of the connection arrangement. The spacer flange is illustrated as being connected to the leg of the connection arrangement at about a 90° angle; however, it can be appreciated that the spacer flange can be connected to the leg of the connection arrangement at other angles. The height of the spacer flanges is non-limiting; however, the height is generally selected so that a tubular insulation, not shown, can be inserted about pipe P. Generally, the height of spacer flanges 960, 970 is at least about 0.25, and typically about 0.5-2 inches; however, other heights can be used. As best illustrated in FIGS. 11-13, the spacer flanges 960, 970 face one another when secured to a building structure and are spaced in generally the same location along the longitudinal axis of the spacer and clamp 900. As can be appreciated, the spacer flanges do not have to be positioned directly opposite from another when the spacer and clamp 900 is connected to the building structure B, thus the spacer and clamp 900 can be designed such that the legs are off-set from one another when the spacer and clamp 900 are connected to the building structure B. As best illustrated in FIG. 15, spacer flange 960 includes a lock tab 980 and spacer flange 970 includes a lock opening 990. The lock tab is designed to move between an unlocked and locked position as illustrated in FIG. 15. As can be appreciated, the spacer flanges can include other or additional arrangements to connect together the spacer flanges (e.g., screw, bolt and nut, rivet, adhesive, weld, solder, clamp, etc). As can also be appreciated, the spacer flanges can include more than one connection opening for use with more than one connector.

The pipe holding section 910 is illustrated as having a tubular housing 920 that has a generally circular cross-sectional shape as best illustrated in FIGS. 13 and 14. As can be appreciated, the cross-sectional shape of housing 920 can be a shape other than circular. The housing 920 forms an inner cavity 930 at least when the spacer and clamp 900 is connected to the building structure B as illustrated in FIG. 13. The inner cavity 930 is illustrated as having a generally circular cross-sectional shape to accommodate standard shaped pipe P; however, it will be appreciated that the cross-sectional shape of cavity 930 can be other than circular. The inner surface of housing 920 can include one or more gripping elements, not shown; however, this is not required. The housing 920 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 920 can be formed of two components and connected together by a rotating, pivoting or flexible hinge, not shown. If some type of hinge is used, the hinge is generally located at the opposite side of the housing from the location where the spacer legs are connected to the housing; however, this is not required.

The assembly of an insulated pipe P using the spacer and clamp 900 will now be briefly described. Pipe holding section 910 is formed of a bendable and/or flexible material that enables a pipe P to be inserted into the cavity 930 of housing 920. The spacer flanges 960, 970 are pulled back so that pipe P can be slipped into cavity 930. Once the pipe is positioned in cavity 930, the spacer flanges are pushed together and the lock tab 980 is pushed into lock opening 990 to cause the spacer flanges to be locked together. Leg 1010 can be secured to building structure B by screw 1050 prior to or after the lock tab 980 is pushed into lock opening 990 as illustrated in FIGS. 13 and 15. Gripping members, when used, hold the pipe in position in the cavity 930 of housing 920 so as to inhibit or prevent vibration, rotation and/or other types of movement of the pipe in the cavity. Once the leg is secured to the building structure via screw 1050 through connection openings 1012, insulation, not shown, can be placed about the pipe and spacer and clamp 900. The insulation, when used, is typically a foam material that includes a longitudinal slit. When installing the insulation, the edges of the slit are pulled apart thereby enabling the insulation to be fit about the pipe. Since the pipe is mounted at a spaced distance from the building structure, the insulation can be easily and conveniently placed about the complete outer perimeter of the pipe. The insulation can also be placed completely or nearly completely about housing 920. The spacer flanges 960, 970 are designed to extend generally parallel to the inside faces of the slit of the insulation. As such, the insulation conforms to the housing and the slit faces engage the space flanges thereby allowing for easy and convenient installation of the insulation about the spacer and clamp 900. When the faces of the slit include an adhesive or an adhesive is applied to the slit face, the slit faces can be then secured to the spacer flanges 960, 970; however, this is not required. As can be appreciated, the insulation can be inserted about the pipe and spacer and clamp prior to being secured to the building structure.

Referring now to FIGS. 16-18, another improved spacer and clamp 1100 is disclosed. The improved spacer and clamp 1100 includes three basic components, namely 1) a pipe holding section 1110, 2) a spacer section 1150, and 3) a connection arrangement 1200. The materials used to form the improved spacer and clamp 1100 are non-limiting. Generally the improved spacer and clamp 1100 is made of a plastic and/or metal material. The pipe holding section 1110, the spacer section 1150 and the connection arrangement 1200 can be formed of the same or different materials. The improved spacer and clamp 1100 can be formed from a single piece of material or be formed from multiple pieces of materials that can be secured and/or connected together. The size of the improved spacer and clamp 1100 is also non-limiting. The improved spacer and clamp 1100 can be made in a variety of ways such as, but not limited to, molding, stamping, cutting, casting, etc.

As illustrated in FIG. 16, the connection arrangement 1200 is secured to a building structure B such as a wood column or beam in a wall, floor or ceiling. The connection arrangement includes one leg 1210; however, it can be appreciated that the connection arrangement can include more than one leg. Leg 1210 includes a connection opening 1212 that is designed to receive a screw 1250 or some other connection element (e.g., nail, bolt, rivet, etc.) to secure each leg to building structure B. As can be appreciated, the leg does not require a preformed connection opening. In such an arrangement, an installer could drive a nail, screw, etc. through the leg to form a connection opening during the connection of the leg to a structure. As can also be appreciated, the leg can include a mark or pop-out region that facilitates in locating a region on the leg to insert the connection element and/or to form the connection opening in the leg. The connection opening in the leg is formed at some non-normal angle relative to the plane of the base of the leg. Generally the angle of the connection opening relative to the plane of the base of the leg is about 45°-89°, and typically about 70°-90°; however, it will be appreciated that other angles can be used. It can be appreciated that the connection opening can be generally normal to the base of a leg. The thickness of the leg 1210 is illustrated as being tapered. As can be appreciated, tapering of the leg is not required. The angle of taper for leg 1210 is about 1°-45°, and typically about 5°-15°; however, it will be appreciated that other taper angles can be used. As can be appreciated, the leg can be connected by other or additional arrangements (e.g., adhesive, clamp, etc). As can also be appreciated, the leg can include more than one connection opening for use with more than one connector. The base of leg 1210 can include a gripping arrangement, not shown. The back end of leg 1210 includes a lock recess 1214 to engage with a spacer flange as will be described in more detail below.

The spacer section 1150 is formed by two spacer flanges 1160, 1170. The spacer flanges are illustrated as having the same width; however, this is not required. The spacer flanges are illustrated as having a uniform thickness along the height of the spacer flanges; however, this is not required. The height of the two spacer flanges are different. Spacer flange 1170 is connected to leg 1210 of the connection arrangement. The spacer flange is illustrated as being connected to the end of a leg of the connection arrangement; however, it can be appreciated that the spacer flange can be connected to other regions of the leg of the connection arrangement. The spacer flange is illustrated as being connected to the leg of the connection arrangement at about a 90° angle; however, it can be appreciated that the spacer flange can be connected to the leg of the connection arrangement at other angles. The height of the spacer flanges is non-limiting; however, the height is generally selected so that a tubular insulation, not shown, can be inserted about pipe P. Generally, the height of spacer flanges 1160, 1170 is at least about 0.25, and typically about 0.5-2 inches; however, other heights can be used. As best illustrated in FIGS. 16 and 18, the spacer flanges 1160, 1170 face one another when secured to a building structure and are spaced in generally the same location along the longitudinal axis of the spacer and clamp 1100. As can be appreciated, the spacer flanges do not have to be positioned directly opposite from one another when the spacer and clamp 1100 is connected to the building structure B, thus the spacer and clamp 1100 can be designed such that the legs are off-set from one another when the spacer and clamp 1100 is connected to the building structure B. As best illustrated in FIG. 15, spacer flange 1160 includes a lock lip 1180 and spacer flange 1170 includes an opening 1190. Opening 1190 is sized and designed to enable spacer flange 1160 to pass through the opening to enable lip 1180 to engage lock recess 1214 on leg 1210 thereby causing the spacer flanges to be locked together as illustrated in FIGS. 17 and 18. As can be appreciated, the spacer flanges can include other or additional configurations to connect the spacer flanges together (e.g., screw, bolt and nut, rivet, adhesive, weld, solder, clamp, etc). As can also be appreciated, the spacer flanges can include more than one connection arrangement to secure together the spacer flanges.

The pipe holding section 1110 is illustrated as having a tubular housing 1120 that has a generally circular cross-sectional shape as best illustrated in FIGS. 16 and 18. As can be appreciated, the cross-sectional shape of housing 1120 can be a shape other than circular. The housing 1120 forms an inner cavity 1130 at least when the spacer and clamp 1100 is connected to the building structure B as illustrated in FIG. 16. The inner cavity 1130 is illustrated as having a generally circular cross-sectional shape to accommodate standard shaped pipe P; however, it will be appreciated that the cross-sectional shape of cavity 1130 can be other than circular. The inner surface of housing 1120 can include one or more gripping elements, not shown; however, this is not required. The housing 1120 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 1120 can be formed of two components and connected together by a rotating, pivoting, or flexible hinge, not shown. If some type of hinge is used, the hinge is generally located at the opposite side of the housing from the location where the spacer legs are connected to the housing; however, this is not required.

The assembly of an insulated pipe P using the spacer and clamp 1100 will now be briefly described. Pipe holding section 1110 is formed of a bendable and/or flexible material that enables a pipe P to be inserted into the cavity 1130 of housing 1120. The spacer flanges 1160, 1170 are pulled back so that pipe P can be slipped into cavity 1130. Once the pipe is positioned in cavity 1130, the spacer flanges are pushed together and the spacer flange 1160 is connected to leg 1210. Leg 1210 can be secured to building structure B by screw 1250 prior to or after the spacer flange is connected to leg 1210 as illustrated in FIGS. 16 and 18. Gripping members, when used, hold the pipe in position in the cavity 1130 of housing 1120 so as to inhibit or prevent vibration, rotation and/or other types of movement of the pipe in the cavity. Once the leg is secured to the building structure via screw 1250 through connection openings 1212, insulation, not shown, can be placed about the pipe and spacer and clamp 1100. The insulation, when used, is typically a foam material that includes a longitudinal slit. When installing the insulation, the edges of the slit are pulled apart thereby enabling the insulation to be fit about the pipe. Since the pipe is mounted at a spaced distance from the building structure, the insulation can be easily and conveniently placed about the complete outer perimeter of the pipe. The insulation can also be placed completely or nearly completely about housing 1120. The spacer flanges 1160, 1170 are designed to extend generally parallel to the inside faces of the slit of the insulation. As such, the insulation conforms to the housing and the slit faces engage the space flanges thereby allowing for easy and convenient installation of the insulation about the spacer and clamp 1100. When the faces of the slit include an adhesive or an adhesive is applied to the slit face, the slit faces can be then secured to the spacer flanges 1160, 1170; however, this is not required. As can be appreciated, the insulation can be inserted about the pipe and spacer and clamp prior to being secured to the building structure.

Referring now to FIGS. 19-21, another improved spacer and clamp 1300 is disclosed. The improved spacer and clamp 1300 includes three basic components, namely 1) a pipe holding section 1310, 2) a spacer section 1350, and 3) a connection arrangement 1400. The materials used to form the improved spacer and clamp 1300 are non-limiting. Generally the improved spacer and clamp 1300 is made of a plastic and/or metal material. The pipe holding section 1310, the spacer section 1350 and the connection arrangement 1400 can be formed of the same or different materials. The improved spacer and clamp 1300 can be formed from a single piece of material or be formed from multiple pieces of materials that can be secured and/or connected together. The size of the improved spacer and clamp 1300 is also non-limiting. The improved spacer and clamp 1300 can be made in a variety of ways such as, but not limited to, molding, stamping, cutting, casting, etc.

As illustrated in FIG. 19, the connection arrangement 1400 is secured to a building structure B such as a wood column or beam in a wall, floor or ceiling. The connection arrangement includes one leg 1410; however, it can be appreciated that the connection arrangement can include more than one leg. Leg 1410 includes a connection opening 1412 that is designed to receive a screw 1450 or some other connection element (e.g., nail, bolt, rivet, etc.) to secure each leg to building structure B. As can be appreciated, the leg does not require a preformed connection opening. In such an arrangement, an installer could drive a nail, screw, etc. through the leg to form a connection opening during the connection of the leg to a structure. As can also be appreciated, the leg can include a mark or pop-out region that facilitates in locating a region on the leg to insert the connection element and/or to form the connection opening in the leg. The connection opening in the leg is formed at some non-normal angle relative to the plane of the base of the leg. Generally the angle of the connection opening relative to the plane of the base of the leg is about 45°-89°, and typically about 70°-90°; however, it will be appreciated that other angles can be used. It can be appreciated that the connection opening can be generally normal to the base of a leg. The thickness of the leg 1410 is illustrated as being tapered. As can be appreciated, tapering of the leg is not required. The angle of taper for leg 1410 is about 1°-45°, and typically about 5°-15°; however, it will be appreciated that other taper angles can be used. As can be appreciated, the legs kg can be connected by other or additional arrangements (e.g., adhesive, clamp, etc). As can also be appreciated, the legs can include more than one connection opening for use with more than one connector. The base of leg 1410 can include a gripping arrangement, not shown. The back end of leg 1410 includes a lock recess 1414 to engage with a spacer flange as will be described in more detail below.

The spacer section 1350 is formed by three spacer flanges 1360, 1370, 1380. The spacer flanges are illustrated as having the same width; however, this is not required. The spacer flanges are illustrated as having a uniform thickness along the height of the spacer flanges; however, this is not required. The height of the three spacer flanges are different. Spacer flange 1370 is connected to leg 1410 of the connection arrangement. The spacer flange 1370 is illustrated as being connected to the end of the leg of the connection arrangement; however, it can be appreciated that the spacer flange can be connected to other regions of the leg of the connection arrangement. The spacer flange is illustrated as being connected to the leg of the connection arrangement at about a 90° angle; however, it can be appreciated that the spacer flange can be connected to the leg of the connection arrangement at other angles. The height of the spacer flanges is non-limiting; however, the height is generally selected so that a tubular insulation, not shown, can be inserted about pipe P. Generally, the height of spacer flanges 1360, 1370, 1380 is at least about 0.25, and typically about 0.5-2 inches; however, other heights can be used. As best illustrated in FIGS. 19 and 21, the spacer flanges 1360, 1370 face one another when secured to a building structure and are spaced in generally the same location along the longitudinal axis of the spacer and clamp 1300. As can be appreciated, the spacer flanges do not have to be positioned directly opposite from another when the spacer and clamp 1300 is connected to the building structure B, thus the spacer and clamp 1300 can be designed such that a legs are off-set from one another when the spacer and clamp 1300 is connected to the building structure B. Spacer flange 1380 is off-set from spacer flanges 1360, 1370 when the spacer and clamp 1300 is secured to building structure B as illustrated in FIG. 19. As best illustrated in FIG. 21, spacer flange 1380 includes a lock lip 1390. As can be appreciated, the spacer flanges include other or additional arrangements to connect the spacer flanges together (e.g., screw, bolt and nut, rivet, adhesive, weld, solder, clamp, etc). As can also be appreciated, the spacer flanges can include more than one connection arrangement to connect the spacer flanges together.

The pipe holding section 1310 is illustrated as having a tubular housing 1320 that has a generally circular cross-sectional shape as best illustrated in FIGS. 19 and 21. As can be appreciated, the cross-sectional shape of housing 1320 can be a shape other than circular. The housing 1320 forms an inner cavity 1330 at least when the spacer and clamp 1300 is connected to the building structure B as illustrated in FIG. 19. The inner cavity 1330 is illustrated as having a generally circular cross-sectional shape to accommodate standard shaped pipe P; however, it will be appreciated that the cross-sectional shape of cavity 1330 can be other than circular. The inner surface of housing 1320 can include one or more gripping elements, not shown; however, this is not required. The housing 1320 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 1320 can be formed of two components and connected together by a rotating, pivoting or flexible hinge, not shown. If some type of hinge is used, the hinge is generally located at the opposite side of the housing from the location where the spacer legs connected to the housing; however, this is not required.

The assembly of an insulated pipe P using the spacer and clamp 1300 will now be briefly described. Pipe holding section 1310 is formed of a bendable and/or flexible material that enables a pipe P to be inserted into the cavity 1330 of housing 1320. The spacer flanges 1360, 1370, 1380 are pulled back so that pipe P can be slipped into cavity 1330. Once the pipe is positioned in cavity 1330, the spacer flanges are pushed together and the spacer flange 1380 is connected to leg 1410. Leg 1410 can be secured to building structure B by screw 1450 prior to or after the spacer flange 1380 is connected to leg 1410 as illustrated in FIGS. 19 and 21. Gripping members, when use, hold the pipe in position in the cavity 1330 of housing 1320 so as to inhibit or prevent vibration, rotation and/or other types of movement of the pipe in the cavity. Once the leg is secured to the building structure via screw 1450 through connection openings 1412 insulation, not shown, can be placed about the pipe and spacer and clamp 1300. The insulation, when used, is typically a foam material that includes a longitudinal slit. When installing the insulation, the edges of the slit are pulled apart thereby enabling the insulation to be fit about the pipe. Since the pipe is mounted at a spaced distance from the building structure, the insulation can be easily and conveniently placed about the complete outer perimeter of the pipe. The insulation can also be placed completely or nearly completely about housing 1320. The spacer flanges 1360, 1370, 1380 are designed to extend generally parallel to the inside faces of the slit of the insulation. As such, the insulation conforms to the housing and the slit faces engage the space flanges thereby allowing for easy and convenient installation of the insulation about the spacer and clamp 1300. When the faces of the slit include an adhesive or an adhesive is applied to the slit face, the slit faces can be then secured to the spacer flanges 1360, 1370, 1380; however, this is not required. As can be appreciated, the insulation can be inserted about the pipe and spacer and clamp prior to being secured to the building structure.

Referring now to FIGS. 22-25, another improved spacer and clamp 1500 is disclosed. The improved spacer and clamp 1500 includes three basic components, namely 1) a pipe holding section 1510, 2) a spacer section 1550, and 3) a connection arrangement 1600. The materials used to form the improved spacer and clamp 1500 are non-limiting. Generally the improved spacer and clamp 1500 is made of a plastic and/or metal material. The pipe holding section 1510, the spacer section 1550 and the connection arrangement 1600 can be formed of the same or different materials. The improved spacer and clamp 1500 can be formed from a single piece of material or be formed from multiple pieces of materials that can be secured and/or connected together. The size of the improved spacer and clamp 1500 is also non-limiting. The improved spacer and clamp 1500 can be made in a variety of ways such as, but not limited to, molding, stamping, cutting, casting, etc.

Figure 22:
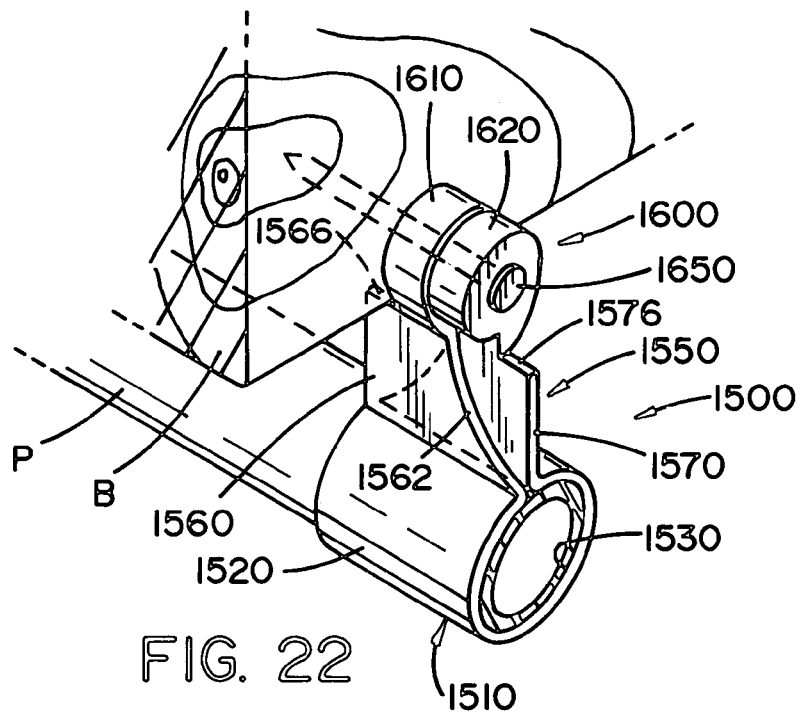
FIG. 22 is a side elevation view of a pipe that is connected to a building structure by another improved spacer and clamp in accordance with the present invention.
Figure 23:
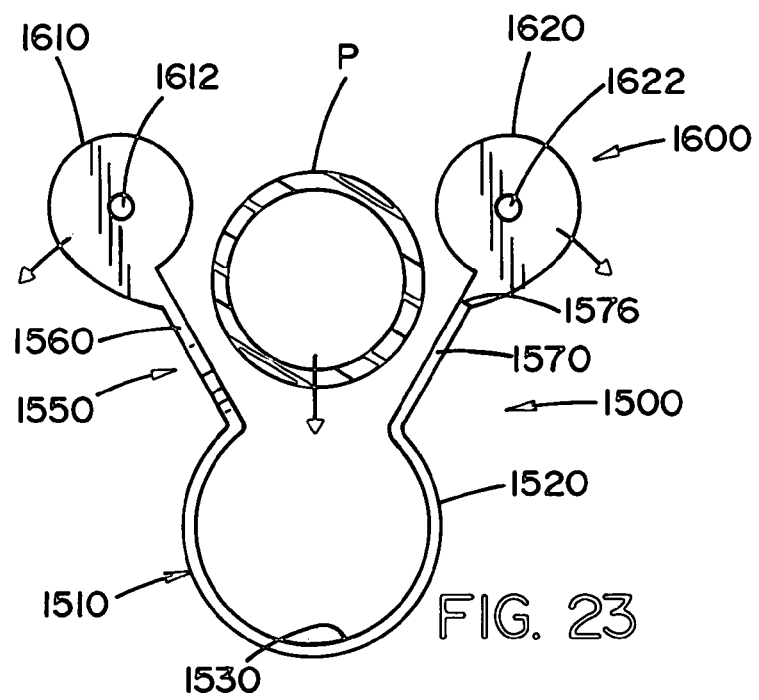
FIG. 23 is an end view of the improved spacer and clamp of FIG. 22 wherein the improved spacer and clamp is in an open position to insert a pipe into the pipe holding section.
Figure 24:
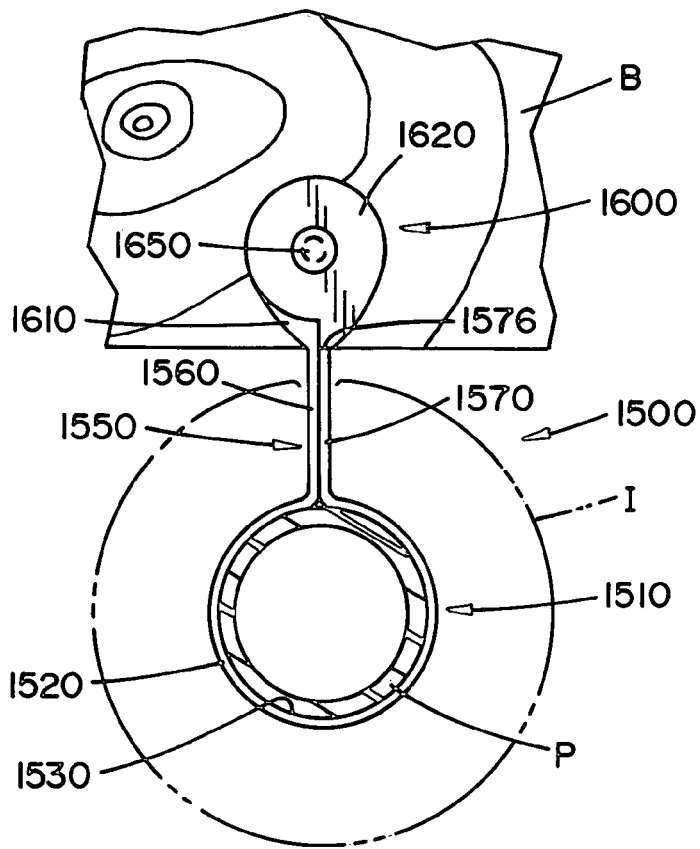
FIG. 24 is an end view of the improved spacer and clamp of FIG. 22 showing insulation, when used, positioned about the pipe and the spacer and clamp.
Figure 25:
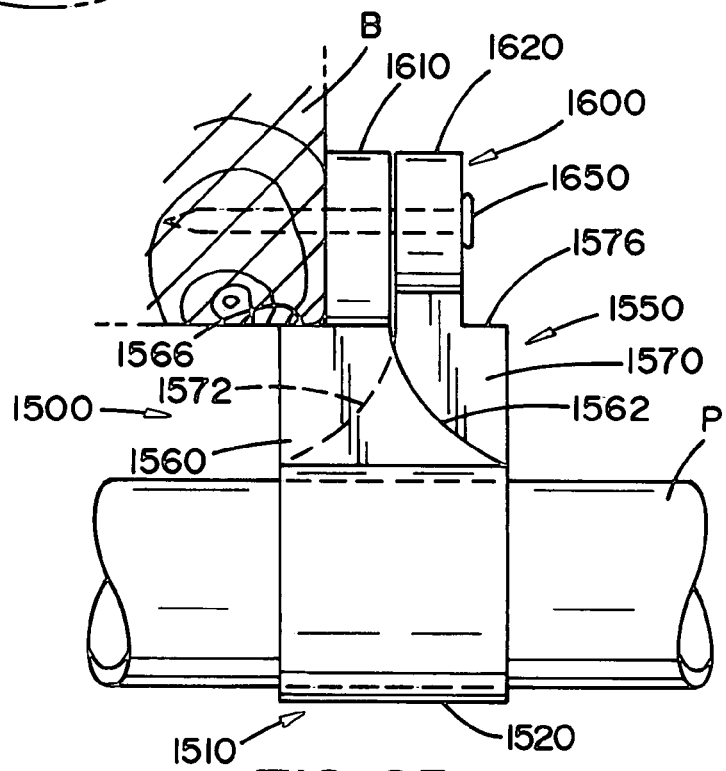
FIG. 25 is a side view of the improved spacer and clamp of FIG. 22.

As illustrated in FIGS. 22, 24 and 25, the connection arrangement 1600 is secured to a building structure B such as a wood column or beam in a wall, floor or ceiling. The connection arrangement includes two legs 1610, 1620; however, it can be appreciated that the connection arrangement can include one leg or more than two legs. Legs 1610, 1620 include connection opening 1612, 1622 that are designed to receive a screw 1650 or some other connection element (e.g., nail, bolt, rivet, etc.) to secure each leg to building structure B. As can be appreciated, the legs do not require a preformed connection opening. In such an arrangement, an installer could drive a nail, screw, etc. through the legs to form a connection opening during the connection of the legs to a structure. As can also be appreciated, one or more legs can include a mark or pop-out region that facilitates in locating a region on the leg to insert the connection element and/or to form the connection opening in the legs. The connection opening in the legs is formed at a generally normal angle relative to the plane of the base of the leg; however, this is not required. The thickness of legs 1610, 1620 are illustrated as being the same and constant; however, this is not required. As can be appreciated, the legs can be connected by other or additional arrangements (e.g., adhesive, clamp, etc). As can also be appreciated, the legs can include more than one connection opening for use with more than one connector. The base of leg 1610 can include a gripping arrangement, not shown. The legs are illustrated as having a generally circular shape; however, it can be appreciated that other shapes can be used.

The spacer section 1550 is formed by two spacer flanges 1560, 1570. The spacer flanges are illustrated as having generally the same shape; however, this is not required. The spacer flanges are illustrated as having a uniform thickness along the height of the spacer flanges; however, this is not required. The height of the spacer flanges is illustrated as being the same; however, this is not required. Spacer flange 1560 is connected to leg 1610 of the connection arrangement.

The spacer flange 1560 is illustrated as being connected to the bottom side of leg 1610 of the connection arrangement; however, it can be appreciated that the spacer flange can be connected to other regions of the leg of the connection arrangement. The spacer flange is illustrated as being connected to the leg of the connection arrangement at about a 90° angle relative to the face of the leg; however, it can be appreciated that the spacer flange can be connected to the leg of the connection arrangement at other angles. Likewise, spacer flange 1570 is illustrated as being connected to the bottom side of leg 1620 of the connection arrangement; however, it can be appreciated that the spacer flange can be connected to other regions of the leg of the connection arrangement. The spacer flange 1570 is illustrated as being connected to leg 1620 of the connection arrangement at about a 90° angle relative to the face of the leg; however, it can be appreciated that the spacer flange can be connected to the leg of the connection arrangement at other angles. The height of the spacer flanges is non-limiting; however, the height is generally selected so that a tubular insulation, not shown, can be inserted about pipe P. Generally, the height of spacer flanges 1560, 1570 is at least about 0.25, and typically about 0.5-2 inches; however, other heights can be used. As best illustrated in FIGS. 22, 24, and 25, the spacer flanges 1560, 1570 face one another when secured to a building structure and are spaced in generally the same location along the longitudinal axis of the spacer and clamp 1500. As can be appreciated, the spacer flanges do not have to be positioned directly opposite from another when the spacer and clamp 1500 is connected to the building structure B, thus the spacer and clamp 1500 can be designed such that the legs are off-set from one another when the spacer and clamp 1500 is connected to the building structure B. The spacer flanges are designed to have a receding portion 1562, 1572. The receding portions on the spacer flanges makes it easier to cause the spacer flanges to be separated from one another when inserting the pipe in the pipe holding section 1510. As can be appreciated, one or both of the spacer flanges does not require a receding portion and/or a different shaped receding portion is used. As illustrated in FIG. 22, legs 1610, 1620 are spaced from outer edges of the spacer flanges 1560, 1570 to create a front and back landing 1566, 1576. The height of the two landings is generally the same; however, this is not required. The landings can be used to orient the top of the spacer flanges and the legs at the bottom portion of a beam joist, etc.; however, this is not required. As can be appreciated, the legs can be oriented on the spacer flange such that the spacer flanges only include one landing. As can also be appreciated, the legs can be oriented on the spacer flange such that the spacer flanges do not include any landings. As can be appreciated, the spacer flanges can be connected together by one or more connection arrangements (e.g., screw, bolt and nut, rivet, adhesive, weld, solder, clamp, lock tab, etc).

The pipe holding section 1510 is illustrated as having a tubular housing 1520 that has a generally circular cross-sectional shape as best illustrated in FIGS. 22 and 24. As can be appreciated, the cross-sectional shape of housing 1520 can be a shape other than circular. The housing 1520 forms an inner cavity 1530 at least when the spacer and clamp 1500 is connected to the building structure B as illustrated in FIG. 22. The inner cavity 1530 is illustrated as having a generally circular cross-sectional shape to accommodate standard shaped pipe P; however, it will be appreciated that the cross-sectional shape of cavity 1530 can be other than circular. The inner surface of housing 1520 can include one or more gripping elements, not shown; however, this is not required. The housing 1520 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 1520 can be formed of two components and connected together by a rotating, pivoting or flexible hinge, not shown. If some type of hinge is used, the hinge is generally located at the opposite side of the housing from the location where the spacer legs are connected to the housing; however, this is not required.

The assembly of an insulated pipe P using the spacer and clamp 1500 will now be briefly described. Pipe holding section 1510 is formed of a bendable and/or flexible material that enables a pipe P to be inserted into the cavity 1530 of housing 1520. The spacer flanges 1560, 1570 are pushed back by pushing on the recessed portions on each spacer flange so that pipe P can be slipped into cavity 1530. Once the pipe is positioned in cavity 1530, the spacer flanges are pushed together until the connection openings on each leg are generally aligned with one another. Legs 1610, 1620 can be secured to building structure B by inserting screw 1650 through the connection openings in each of the legs and into building structure B. The insertion of screw 1650 through the two connection openings locks the legs and spacer flanges together. Gripping members, when used, hold the pipe in position in the cavity 1530 of housing 1520 so as to inhibit or prevent vibration, rotation and/or other types of movement of the pipe in the cavity. Once the legs are secured to the building structure via screw 1650 through connection openings 1612, 1622, insulation, not shown, can be placed about the pipe and spacer and clamp 1500. The insulation, when used, is typically a foam material that includes a longitudinal slit. When installing the insulation, the edges of the slit are pulled apart thereby enabling the insulation to be fitted about the pipe. Since the pipe is mounted at a spaced distance from the building structure, the insulation can be easily and conveniently placed about the complete outer perimeter of the pipe. The insulation can also be placed completely or nearly completely about housing 1520. The spacer flanges 1560, 1570 are designed to extend generally parallel to the inside faces of the slit of the insulation. As such, the insulation conforms to the housing and the slit faces engage the space flanges thereby allowing for easy and convenient installation of the insulation about the spacer and clamp 1500. When the faces of the slit include an adhesive or an adhesive is applied to the slit face, the slit faces can be then secured to the spacer flanges 1560, 1570; however, this is not required. As can be appreciated, the insulation can be inserted about the pipe and spacer and clamp prior to being secured to the building structure.

Figure 26:
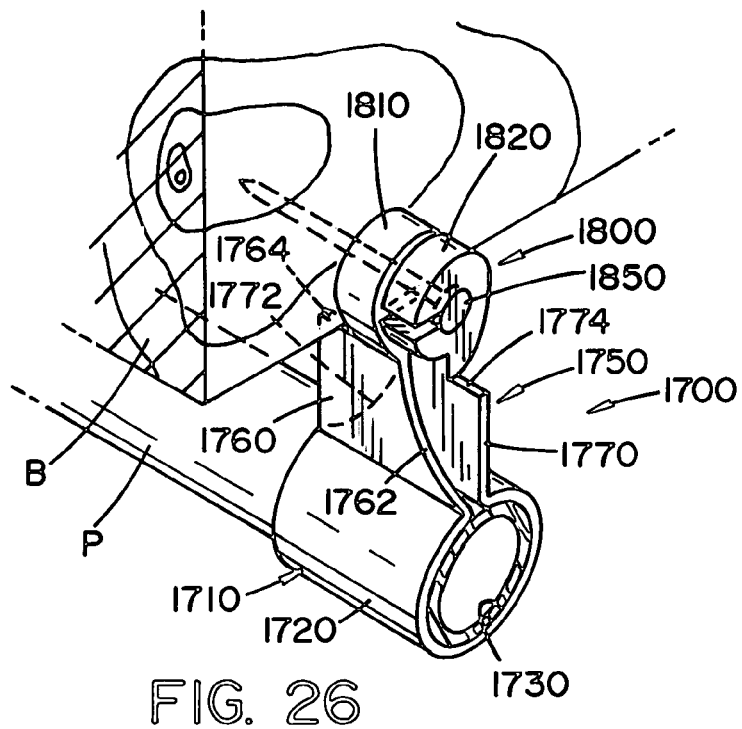
FIG. 26 is a side elevation view of a pipe that is connected to a building structure by another improved spacer and clamp in accordance with the present invention.
Figure 27:
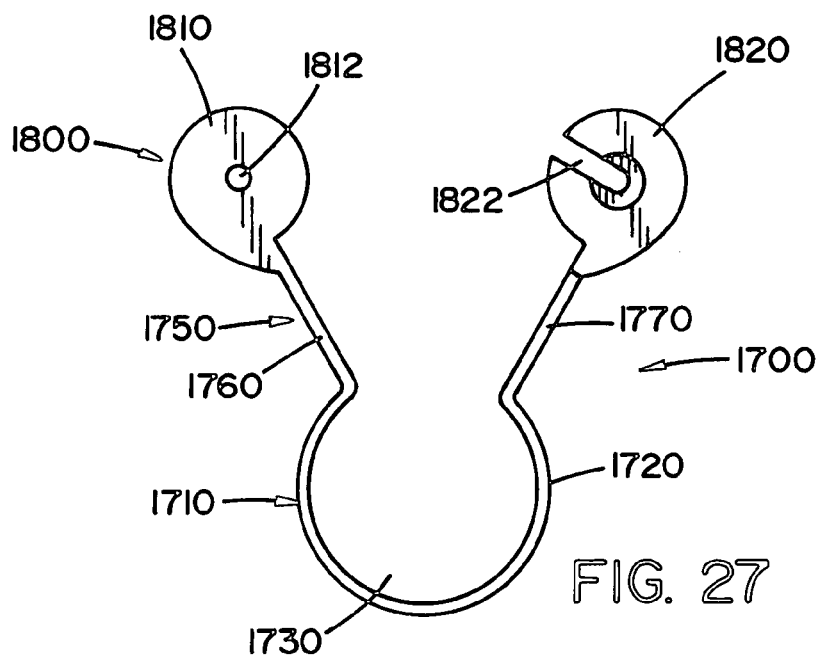
FIG. 27 is an end view of the improved spacer and clamp of FIG. 26 wherein the improved spacer and clamp is in an open position.

Referring now to FIGS. 26-27, another improved spacer and clamp 1700 is disclosed. The improved spacer and clamp 1700 includes three basic components, namely 1) a pipe holding section 1710, 2) a spacer section 1750, and 3) a connection arrangement 1800. The materials used to form the improved spacer and clamp 1700 are non-limiting. Generally the improved spacer and clamp 1700 is made of a plastic and/or metal material. The pipe holding section 1710, the spacer section 1750 and the connection arrangement 1800 can be formed of the same or different materials. The improved spacer and clamp 1700 can be formed from a single piece of material or be formed from multiple pieces of materials that can be secured and/or connected together. The size of the improved spacer and clamp 1700 is also non-limiting. The improved spacer and clamp 1700 can be made in a variety of ways such as, but not limited to, molding, stamping, cutting, casting, etc.

As illustrated in FIG. 26, the connection arrangement 1800 is secured to a building structure B such as a wood column or beam in a wall, floor or ceiling. The connection arrangement includes two legs 1810, 1820; however, it can be appreciated that the connection arrangement can include one leg or more than two legs. Leg 1810 includes a connection opening 1812 that is designed to receive a screw 1850 or some other connection element (e.g., nail, bolt, rivet, etc.) to secure each leg to building structure B. Leg 1820 includes a leg slot 1822 that is designed to slide over and receive a screw 1850 or some other connection element. As can be appreciated, leg 1810 does not require a preformed connection opening. In such an arrangement, an installer could drive a nail, screw, etc. through the leg to form a connection opening during the connection of the leg to a structure. As can also be appreciated, the leg can include a mark or pop-out region that facilitates in locating a region on the leg to insert the connection element and/or to form the connection opening in the leg. The connection opening 1812 in leg 1810 and the leg slot in 1822 of leg 1820 is formed at a generally normal angle relative to the plane of the base of the leg; however, this is not required. The thickness of legs 1810, 1820 are illustrated as being the same and constant; however, this is not required. As can be appreciated, the legs can be connected by other or additional arrangements (e.g., adhesive, clamp, lock tab, etc). As can also be appreciated, the legs can include more than one connection opening for use with more than one connector. The base of leg 1810 can include a gripping arrangement, not shown. The legs are illustrated as having a generally circular shape; however, it can be appreciated that other shapes can be used.

The spacer section 1750 is formed by two spacer flanges 1760, 1770. The spacer flanges are illustrated as having generally the same shape; however, this is not required. The spacer flanges are illustrated as having a uniform thickness along the height of the spacer flanges; however, this is not required. The height of the spacer flanges is illustrated as being the same; however, this is not required. Spacer flange 1760 is connected to leg 1810 of the connection arrangement. The spacer flange 1760 is illustrated as being connected to the bottom side of leg 1810 of the connection arrangement; however, it can be appreciated that the spacer flange can be connected to other regions of the leg of the connection arrangement. The spacer flange is illustrated as being connected to the leg of the connection arrangement at about a 90° angle relative to the face of the leg; however, it can be appreciated that the spacer flange can be connected to the leg of the connection arrangement at other angles. Likewise, spacer flange 1770 is illustrated as being connected to the bottom side of leg 1820 of the connection arrangement; however, it can be appreciated that the spacer flange can be connected to other regions of the leg of the connection arrangement. The spacer flange 1770 is illustrated as being connected to leg 1820 of the connection arrangement at about a 90° angle relative to the face of the leg; however, it can be appreciated that the spacer flange can be connected to the leg of the connection arrangement at other angles. The height of the spacer flanges is non-limiting; however, the height is generally selected so that a tubular insulation, not shown, can be inserted about pipe P. Generally, the height of spacer flanges 1760, 1770 is at least about 0.25, and typically about 0.5-2 inches; however, other heights can be used. As best illustrated in FIG. 26, the spacer flanges 1760, 1770 face one another when secured to a building structure and are spaced in generally the same location along the longitudinal axis of the spacer and clamp 1700. As can be appreciated, the spacer flanges do not have to be positioned directly opposite from another when the spacer and clamp 1700 is connected to the building structure B, thus the spacer and clamp 1700 can be designed such that the legs are off-set from one another when the spacer and clamp 1700 is connected to the building structure B. The spacer flanges are designed to have a receding portion 1762, 1772. The receding portions on the spacer flanges makes it easier to cause the spacer flanges to be separated from one another when inserting the pipe in the pipe holding section 1710. As can be appreciated, one or both of the spacer flanges does not require a receding portion and/or a different shaped receding portion is used. As can be appreciated, the spacer flanges can include one or more connection arrangements to secure the spacer flanges together (e.g., screw, bolt and nut, rivet, adhesive, weld, solder, clamp, lock tab, etc).

The pipe holding section 1710 is illustrated as having a tubular housing 1720 that has a generally circular cross-sectional shape as best illustrated in FIG. 26. As can be appreciated, the cross-sectional shape of housing 1720 can be a shape other than circular. The housing 1720 forms an inner cavity 1730 at least when the spacer and clamp 1700 is connected to the building structure B as illustrated in FIG. 26. The inner cavity 1730 is illustrated as having a generally circular cross-sectional shape to accommodate standard shaped pipe P; however, it will be appreciated that the cross-sectional shape of cavity 1730 can be other than circular. The inner surface of housing 1720 can include one or more gripping elements, not shown; however, this is not required. The housing 1720 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 1720 can be formed of two components and connected together by a rotating, pivoting or flexible hinge, not shown. If some type of hinge is used, the hinge is generally located at the opposite side of the housing from the location where the spacer legs are connected to the housing; however, this is not required.

The assembly of an insulated pipe P using the spacer and clamp 1700 will now be briefly described. Pipe holding section 1710 is formed of a bendable and/or flexible material that enables a pipe P to be inserted into the cavity 1730 of housing 1720. The spacer flanges 1760, 1770 are pushed back by pushing on the recessed portions on each spacer flange so that pipe P can be slipped into cavity 1730. Once the pipe is positioned in cavity 1730, the spacer flanges are pushed together until the connection opening and leg slot on the legs are generally aligned with one another. Legs 1810, 1820 can be secured to building structure B by inserting screw 1850 through the connection opening 1812 in leg 1810 and into building structure B. The screw is not fully inserted into leg 1810 so that the leg slot in leg 1820 can be slipped over screw 1850. Gripping members, when used, hold the pipe in position in the cavity 1730 of housing 1720 so as to inhibit or prevent vibration, rotation and/or other types of movement of the pipe in the cavity. Once the legs are secured to the building structure via screw 1750 through connection opening 1812 and leg slot 1822, insulation, not shown, can be placed about the pipe and spacer and clamp 1700. The insulation, when used, is typically a foam material that includes a longitudinal slit. When installing the insulation, the edges of the slit are pulled apart thereby enabling the insulation to be fit about the pipe. Since the pipe is mounted at a spaced distance from the building structure, the insulation can be easily and conveniently placed about the complete outer perimeter of the pipe. The insulation can also be placed completely or nearly completely about housing 1720. The spacer flanges 1760, 1770 are designed to extend generally parallel to the inside faces of the slit of the insulation. As such, the insulation conforms to the housing and the slit faces engage the space flanges thereby allowing for easy and convenient installation of the insulation about the spacer and clamp 1700. When the faces of the slit include an adhesive or an adhesive is applied to the slit face, the slit faces can be then secured to the spacer flanges 1760, 1770; however, this is not required. As illustrated in FIG. 26, legs 1810, 1820 are spaced from the outer edges of the spacer flanges 1760, 1770 to create a front and back landing 1764, 1774. The height of the two landings is generally the same; however, this is not required. The landings can be used to orient the top of the spacer flanges and the legs at the bottom portion of a beam, joist, etc.; however, this is not required. As can be appreciated, the legs can be oriented on the spacer flange such that the spacer flanges only include one landing. As can also be appreciated, the legs can be oriented on the spacer flange such that the spacer flanges do not include any landings. As can be appreciated, the insulation can be inserted about the pipe and spacer and clamp prior to being secured to the building structure.

Figure 28:
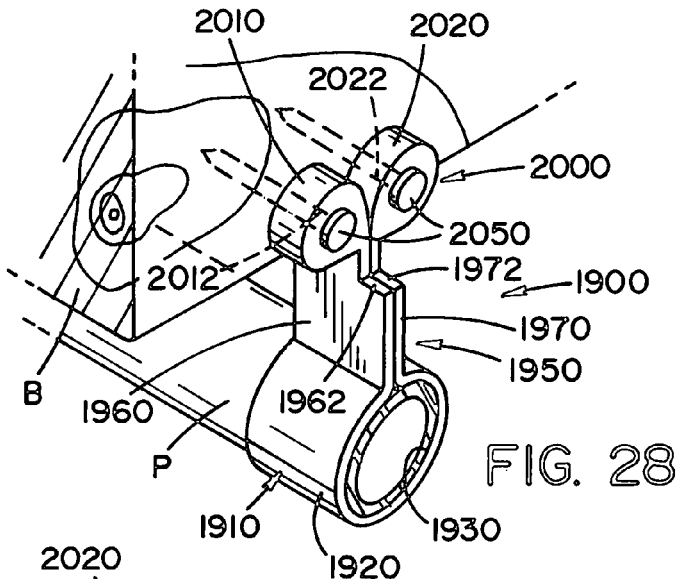
FIG. 28 is a side elevation view of a pipe that is connected to a building structure by another improved spacer and clamp in accordance with the present invention.
Figure 29:
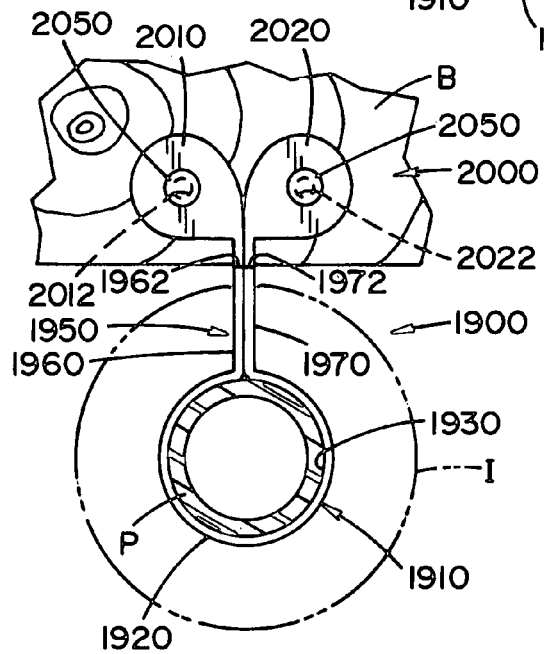
FIG. 29 is an end view of the improved spacer and clamp of FIG. 28 showing insulation, when used, positioned about the pipe and the spacer and clamp.
Figure 30:
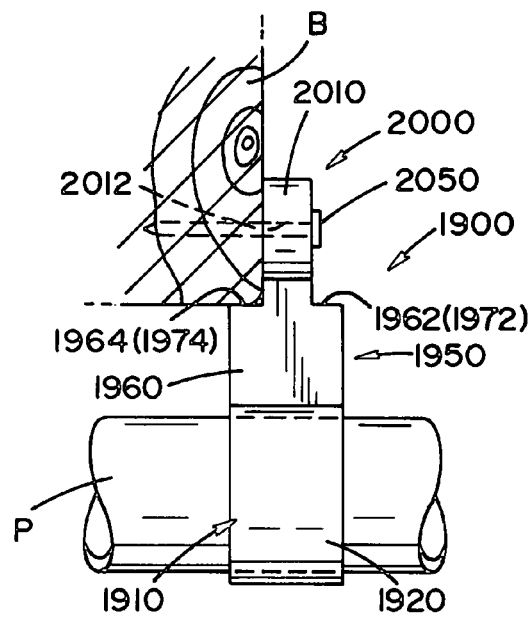
FIG. 30 is a side view of the improved spacer and clamp of FIG. 28.

Referring now to FIGS. 28-30, another improved spacer and clamp 1900 is disclosed. The improved spacer and clamp 1900 includes three basic components, namely 1) a pipe holding section 1910, 2) a spacer section 1950, and 3) a connection arrangement 2000. The materials used to form the improved spacer and clamp 1900 are non-limiting. Generally the improved spacer and clamp 1900 is made of a plastic and/or metal material. The pipe holding section 1910, the spacer section 1950 and the connection arrangement 2000 can be formed of the same or different materials. The improved spacer and clamp 1900 can be formed from a single piece of material or be formed from multiple pieces of materials that can be secured and/or connected together. The size of the improved spacer and clamp 1900 is also non-limiting. The improved spacer and clamp 1900 can be made in a variety of ways such as, but not limited to, molding, stamping, cutting, casting, etc.

As illustrated in FIG. 28, the connection arrangement 2000 is secured to a building structure B such as a wood column or beam in a wall, floor or ceiling. The connection arrangement includes two legs 2010, 2020; however, it can be appreciated that the connection arrangement can include one leg or more than two legs. Legs 2010, 2020 include a connection opening 2012, 2022 that is designed to receive a screw 2050 or some other connection element (e.g, nail, bolt, rivet, etc.) to secure each leg to building structure B. As can be appreciated, legs 2010, 2020 do not require a preformed connection opening. In such an arrangement, an installer could drive a nail, screw, etc. through the legs to form a connection opening during the connection of the legs to a structure. As can also be appreciated, the legs can include a mark or pop-out region that facilitates in locating a region on the legs to insert the connection element and/or to form the connection opening in the legs. The connection opening 2012 in leg 2010 and the connection opening 2022 in leg 2020 are formed at a generally normal angle relative to the plane of the base of the legs; however, this is not required. The thickness of legs 2010, 2020 are illustrated as being the same and constant; however, this is not required. As can be appreciated, the legs can be connected by other or additional arrangements (e.g., adhesive, clamp, etc). As can also be appreciated, the legs can include more than one connection opening for use with more than one connector. The base of legs 2010, 2020 can include a gripping arrangement, not shown. The legs are illustrated as having a generally circular shape; however, it can be appreciated that other shapes can be used. Legs 2010, 2020 are oriented on the spacer and clamp 1900 such that the connection legs face away from one another; however, this is not required.

The spacer section 2000 is formed by two spacer flanges 1960, 1970. The spacer flanges are illustrated as having generally the same shape; however, this is not required. The spacer flanges are illustrated as having a uniform thickness along the height of the spacer flanges; however, this is not required. The height of the spacer flanges is illustrated as being the same; however, this is not required. Spacer flange 1960 is connected to leg 2010 of the connection arrangement. The spacer flange 1960 is illustrated as being connected to the bottom side of leg 2010 of the connection arrangement; however, it can be appreciated that the spacer flange can be connected to other regions of the leg of the connection arrangement. The spacer flange is illustrated as being connected to the leg of the connection arrangement at about a 90° angle relative to the face of the leg; however, it can be appreciated that the spacer flange can be connected to the leg of the connection arrangement at other angles. Likewise, spacer flange 1970 is illustrated as being connected to the bottom side of leg 2020 of the connection arrangement; however, it can be appreciated that the spacer flange can be connected to other regions of the leg of the connection arrangement. The spacer flange 1970 is illustrated as being connected to leg 2020 of the connection arrangement at about a 90° angle relative to the face of the leg; however, it can be appreciated that the spacer flange can be connected to the leg of the connection arrangement at other angles. The height of the spacer flanges is non-limiting; however, the height is generally selected so that a tubular insulation, not shown, can be inserted about pipe P. Generally, the height of spacer flanges 1960, 1970 is at least about 0.25, and typically about 0.5-2 inches; however, other heights can be used. As best illustrated in FIGS. 28 and 29, the spacer flanges 1960, 1970 face one another when secured to a building structure and are spaced in generally the same location along the longitudinal axis of the spacer and clamp 1900. As can be appreciated, the spacer flanges do not have to be positioned directly opposite from another when the spacer and clamp 1900 is connected to the building structure B, thus the spacer and clamp 1900 can be designed such that the legs are off-set from one another when the spacer and clamp 1900 is connected to the building structure B. The spacer flanges can include a receding portion, not shown, that is designed to make it easier to cause the spacer flanges to be separated from one another when inserting the pipe in the pipe holding section 1910; however, this is not required. As illustrated in FIG. 30, legs 2010, 2020 are spaced from the outer edges of the spacer flanges 1960, 1970 to create a front and back landing 1962, 1964 on spacer flange 1960 and a front and back landing 1972, 1974 on spacer flange 1970. The height of the two landings is generally the same; however, this is not required. The landings can be used to orient the top of the spacer flanges and the legs at the bottom portion of a beam, joist, etc.; however, this is not required. As can be appreciated, the legs can be oriented on the spacer flange such that the spacer flanges only include one landing. As can also be appreciated, the legs can be oriented on the spacer flange such that the spacer flanges do not include any landings. As can be appreciated, the spacer flanges can include one or more connection arrangements to secure the spacer flanges together (e.g., screw, bolt and nut, rivet, adhesive, weld, solder, clamp, lock tab, etc).

The pipe holding section 1910 is illustrated as having a tubular housing 1920 that has a generally circular cross-sectional shape as best illustrated in FIGS. 28 and 29. As can be appreciated, the cross-sectional shape of housing 1920 can be a shape other than circular. The housing 1920 forms an inner cavity 1930 at least when the spacer and clamp 1900 is connected to the building structure B as illustrated in FIGS. 28-30. The inner cavity 1930 is illustrated as having a generally circular cross-sectional shape to accommodate standard shaped pipe P; however, it will be appreciated that the cross-sectional shape of cavity 1930 can be other than circular. The inner surface of housing 1920 can include one or more gripping elements, not shown; however, this is not required. The housing 1920 is illustrated as being formed of a single piece of material. Generally the material is a flexible material to enable the spacer legs to be separated from one another while not damaging or breaking the housing so as to enable the pipe to be inserted into the cavity of the housing. As can be appreciated, the housing 1920 can be formed of two components and connected together by a rotating, pivoting or flexible hinge, not shown. If some type of hinge is used, the hinge is generally located at the opposite side of the housing from the location where the spacer legs are connected to the housing; however, this is not required.

The assembly of an insulated pipe P using the spacer and clamp 1900 will now be briefly described. Pipe holding section 1910 is formed of a bendable and/or flexible material that enables a pipe P to be inserted into the cavity 1930 of housing 1920. The spacer flanges 1960, 1970 are pushed back by pulling back and separating legs 2010, 2020 so that pipe P can be slipped into cavity 1930. Once the pipe is positioned in cavity 1930, the spacer flanges and legs are pushed together. Legs 2010, 2020 can be secured to building structure B by inserting screw 2050 through the connection openings 2012, 2022 in the legs and into building structure B. As can be appreciated, pipe P can be inserted into cavity 1930 prior to the legs being secured to building structure B. Alternatively, either leg 2010 or 2020 can be secured to a building structure B, and then the pipe can be inserted into cavity 1930, and thereafter the other leg can be secured to building structure B. Gripping members, when used, hold the pipe in position in the cavity 1930 of housing 1920 so as to inhibit or prevent vibration, rotation and/or other types of movement of the pipe in the cavity. Once the legs are secured to the building structure via screw 2050 through connection openings 2012, 2020, insulation, not shown, can be placed about the pipe and spacer and clamp 1900. The insulation, when used, is typically a foam material that includes a longitudinal slit. When installing the insulation, the edges of the slit are pulled apart thereby enabling the insulation to be fitted about the pipe. Since the pipe is mounted at a spaced distance from the building structure, the insulation can be easily and conveniently placed about the complete outer perimeter of the pipe. The insulation can also be placed completely or nearly completely about housing 1920. The spacer flanges 1960, 1970 are designed to extend generally parallel to the inside faces of the slit of the insulation. As such, the insulation conforms to the housing and the slit faces engage the space flanges thereby allowing for easy and convenient installation of the insulation about the spacer and clamp 1900. When the faces of the slit include an adhesive or an adhesive is applied to the slit face, the slit faces can be then secured to the spacer flanges 1960, 1970; however, this is not required. As can be appreciated, the insulation can be inserted about the pipe and spacer and clamp prior to being secured to the building structure.

Referring now to FIGS. 31-34, another improved spacer and clamp 2100 is disclosed. The improved spacer and clamp 2100 includes three basic components, namely 1) a pipe holding section 2110, 2) a spacer section 2150, and 3) a connection arrangement 2200. The materials used to form the improved spacer and clamp 2100 are non-limiting. Generally the improved spacer and clamp 2100 is made of a plastic and/or metal material. The pipe holding section 2110, the spacer section 2150 and the connection arrangement 2200 can be formed of the same or different materials. The improved spacer and clamp 2100 can be formed from a single piece of material or be formed from multiple pieces of materials that can be secured and/or connected together. The size of the improved spacer and clamp 2100 is also non-limiting. The improved spacer and clamp 2100 can be made in a variety of ways such as, but not limited to, molding, stamping, cutting, casting, etc.

Figure 31:
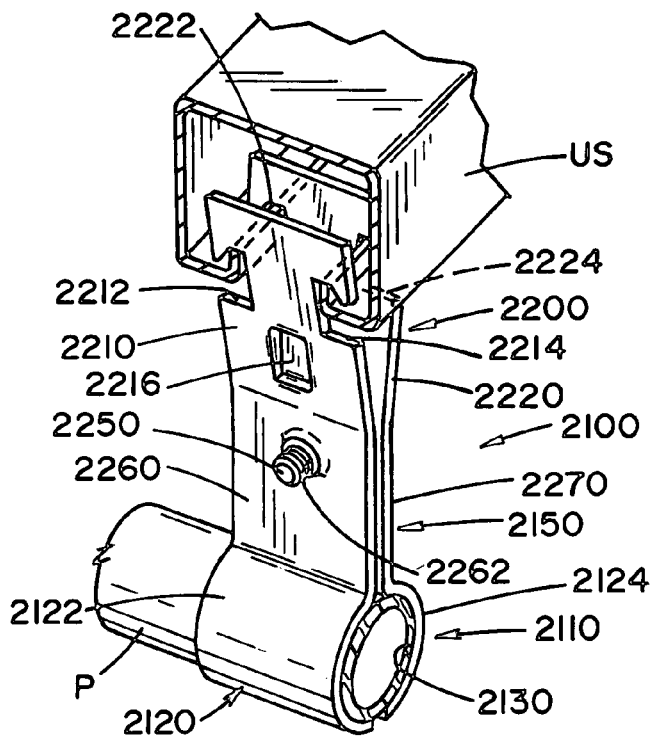
FIG. 31 is a side elevation view of a pipe that is connected to structural steel channel by another improved spacer and clamp in accordance with the present invention.

As illustrated in FIG. 31, the connection arrangement 2200 is secured to a building structure such as a unistrut system US. Unistrut systems are well known in the art, thus will not be described in detail herein. The connection arrangement includes two legs 2210, 2220; however, it can be appreciated that the connection arrangement can include one leg or more than two legs. Legs 2210, 2220 each include two connection slot 2212, 2214, 2222, 2224 that are designed to fit on and be hung from a unistrut system. The two connection slots in each of the connection legs forms a generally T-shaped structure on the top portion of each connection leg; however, it will be appreciated that the top portion of the connection legs can have other shapes. It can be appreciated that other methods of mounting to the steel channel can readily be adapted to the improved stand-off pipe clamps. Some that are already in use for other holding devices include various spring loaded mounting nuts which allow a device to be fixed to the channel with a mounting bolt. There are also mounting plates which work with a twist and a cam. Many of the previously illustrated versions of the improved stand-off pipe clamp could be readily adapted to this application. The connection slots in each of the connection legs enables the connection legs to be hung on and to slide along the unistrut system so as to position the improved spacer and clamp 2100 in the desired position on the unistrut system. The inside surface of each connection leg includes a spacer tab 2216, 2226 that is designed to cause the connection legs to angle away from one another. The angle formed between the two connection legs is about 1°-60°, and typically about 10°-40°; however, it will be appreciated that other angles can be used. As can also be appreciated, only one of the connection legs can be designed to include a spacer tab or neither connection can include a spacer tab. As can also be appreciated, other arrangements can be used to cause the connection legs to angle apart from one another. The one or more spacer tabs, when used, also facilitate in maintaining an angle of separation between the connection legs. The thickness of legs 2210, 2220 are illustrated as being the same and constant; however, this is not required.

Figure 32:
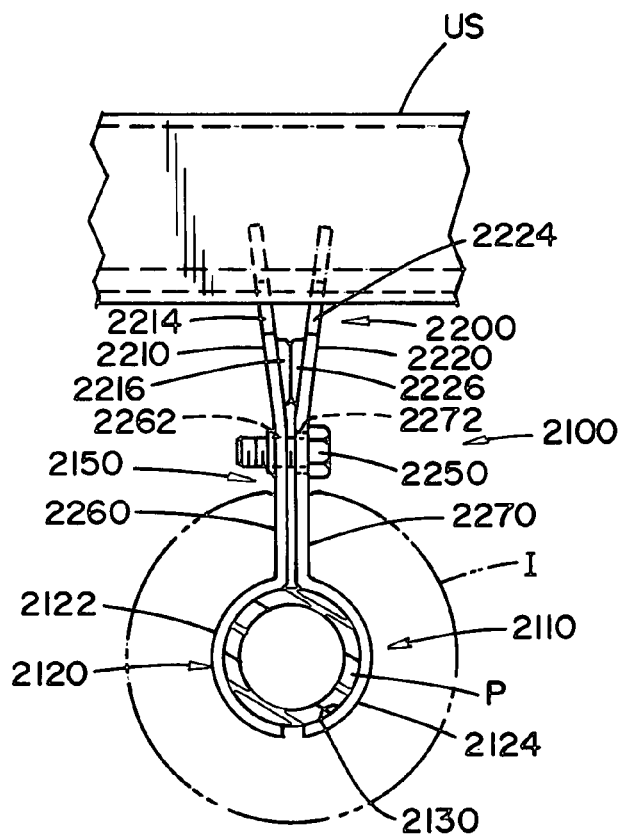
FIG. 32 is an end view of the improved spacer and clamp of FIG. 31 showing insulation, when used, positioned about the pipe and the spacer and clamp.

The spacer section 2150 is formed by two spacer flanges 2260, 2270. The spacer flanges are illustrated as having generally the same shape; however, this is not required. The spacer flanges are illustrated as having a uniform thickness along the height of the spacer flanges; however, this is not required. The height of the spacer flanges is illustrated as being the same; however, this is not required. Spacer flange 2160 is connected to leg 2210 of the connection arrangement. The spacer flange 2260 is illustrated as being connected to the bottom side of leg 2210 of the connection arrangement; however, it can be appreciated that the spacer flange can be connected to other regions of the leg of the connection arrangement. Likewise, spacer flange 2270 is illustrated as being connected to the bottom side of leg 2220 of the connection arrangement; however, it can be appreciated that the spacer flange can be connected to other regions of the leg of the connection arrangement. The height of the spacer flanges is non-limiting; however, the height is generally selected so that a tubular insulation, not shown, can be inserted about pipe P. Generally, the height of spacer flanges 2260, 2270 is at least about 0.25, and typically about 0.5-2 inches; however, other heights can be used. As best illustrated in FIGS. 31, 32 and 33, the spacer flanges 2260, 2270 face one another when secured to the unistrut system US and are spaced in generally the same location along the longitudinal axis of the spacer and clamp 2100. As can be appreciated, the spacer flanges do not have to be positioned directly opposite from one another when the spacer and clamp 2100 is connected to the unistrut system US, thus the spacer and clamp 2100 can be designed such that the legs are off-set from one another when the spacer and clamp 2100 is connected to the unistrut system US. The spacer flanges include at least one connection opening 2262, 2272 that is designed to enable a connector 2250 to connect together the spacer flanges. The connector 2250 is illustrate as being a threaded bolt; however, other types of connectors can be used (e.g., screw, bolt and nut, rivet, etc.). As can be appreciated, the spacer flanges can be connected by other or additional arrangements (e.g., adhesive, weld, solder, clamp, lock tab, etc). As can also be appreciated, the spacer flanges can include more than one connection opening for use with more than one connector.

The pipe holding section 2110 is illustrated as having a generally tubular housing 2120 that has a generally circular cross-sectional shape as best illustrated in FIG. 31-33. As can be appreciated, the cross-sectional shape of housing 2120 can be a shape other than circular. The housing 2120 forms an inner cavity 2130 at least when the spacer and clamp 2100 is connected to the unistrut system US as illustrated in FIGS. 31-33. The inner cavity 2130 is illustrated as having a generally circular cross-sectional shape to accommodate a standard shaped pipe P; however, it will be appreciated that the cross-sectional shape of cavity 2130 can be other than circular. The inner surface of housing 2120 can include one or more gripping elements, not shown; however, this is not required. The housing 2120 is illustrated as being formed of two sections 2122, 2124; however, it can be appreciated that housing 2120 can be formed of a single piece of material. Generally the material that forms the two sections of the housing are relatively rigid materials to inhibit or prevent bend of the two section 2122, 2124. When the housing is formed of a single piece of material, one or more portions of the housing is generally formed of a flexible material so as to enable the spacer legs to be separated from one another while not damaging or breaking the housing so as to enable the pipe to be inserted into the cavity of the housing. As can be appreciated, the two sections of housing 2120 can be connected together by a rotating, pivoting or flexible hinge, not shown. If some type of hinge is used, the hinge is generally located at the opposite side of the housing from the location where the spacer legs connected to the housing; however, this is not required.

The assembly of an insulated pipe P using the spacer and clamp 2100 will now be briefly described. The sections 2122, 2144 of the pipe holding section 2110 are separated from one another and then fitted about pipe P. Thereafter, connector 2250 is threaded through openings 2262, 2272 of spacer flanges 2260, 2270 so as to secure the spacer flanges together and to secure the pipe in cavity 2130 of the pipe holding section. The pipe can then be hung on a Unistrut system by inserting the connection slots 2212, 2214, 2222, 2224 of legs 2210, 2220 into the railing of the Unistrut system. Once the legs are hung on the Unistrut system, insulation I can be placed about the pipe and spacer and clamp 2100. The insulation, when used, is typically a foam material that includes a longitudinal slit. When installing the insulation, the edges of the slit are pulled apart thereby enabling the insulation to be fitted about the pipe. Since the pipe is mounted at a spaced distance from the Unistrut system, the insulation can be easily and conveniently placed about the complete outer perimeter of the pipe. The insulation can also be placed completely or nearly completely about housing 2120. The spacer flanges 2260, 2270 are designed to extend generally parallel to the inside faces of the slit of the insulation. As such, the insulation conforms to the housing and the slit faces engage the space flanges thereby allowing for easy and convenient installation of the insulation about the spacer and clamp 2100. When the faces of the slit include an adhesive or an adhesive is applied to the slit face, the slit faces can then be secured to the spacer flanges 2260, 2270; however, this is not required. As can be appreciated, the insulation can be inserted about the pipe and spacer and clamp 2100 prior to being hung on the Unistrut system.

Figure 39:
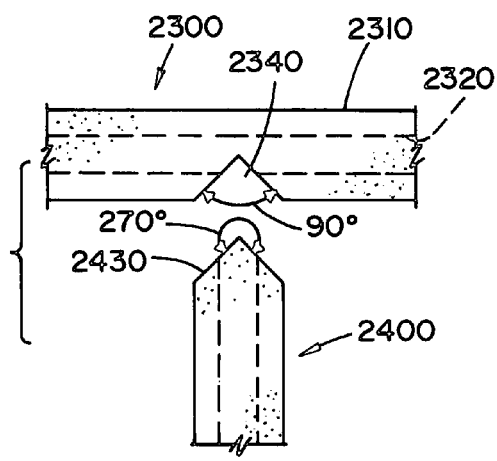
Figure 40:
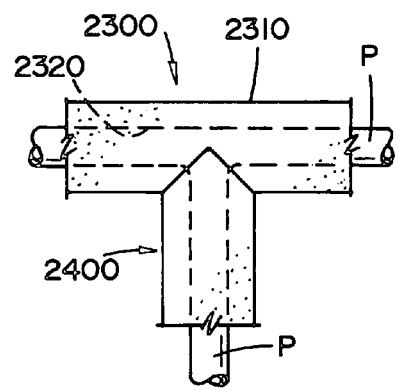
Figure 41:
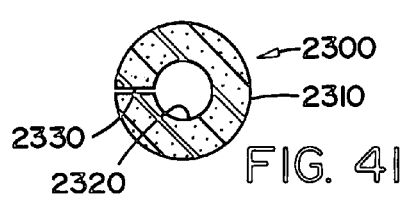

Referring now to FIGS. 35-41, there is illustrated a novel prefabricated tubular insulation that is designed to be used on pipe elbows and joints. Referring to FIG. 41, the tubular insulation 2300 includes an outer shell 2310 and encircles a circular cavity 2320. The outer shell can be formed of any type of insulating material. Generally, the outer shell is formed of a flexible material such as, but not limited to, a foam-type material. The thickness of the outer shell is generally uniform; however, this is not required. Cavity 2320 is sized to fit about a certain outer diameter pipe, not shown. As such, the size of cavity 2320 will partially depend on the size of pipe to be insulated. The outer shell includes a slit 2330 that travels along the longitudinal axis of the insulation 2300. As can be appreciated, the outer shell can include more than one slit. One or both of the inner surfaces of the slit can include an adhesive material; however, this is not required.

Figure 35:
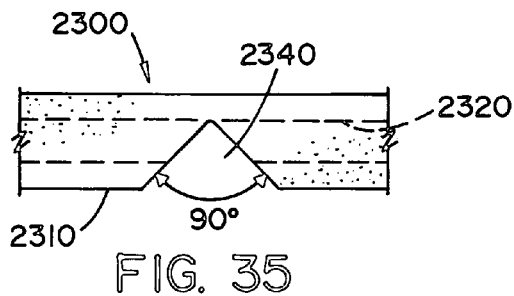
Figure 36:
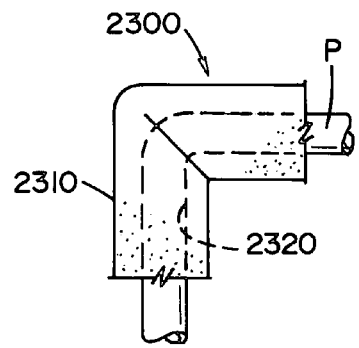

Referring now to FIG. 35-40, various preformed sections of insulation 2300 are illustrated. As illustrated in FIGS. 35 and 36, insulation 2300 is formed so as to conveniently fit about a 90° elbow joint in a pipe P. As shown in FIG. 35, a slot 2340 is cut or formed in insulation 2300. The slot forms a generally 90° angle; however the angle can be about 70-110°. The depth of the slot is such that it does not completely penetrate through the complete cross-section of the insulation. As shown in FIG. 35, the slot penetrates through one side of the insulation, through a first wall of cavity 2320, and stops at the opposite second wall side of the cavity such that generally one outer shell thickness is maintained. As can be appreciated, the slot can be designed to penetrate at least 50% into cavity 2320 and no more than 75% into the outer shell wall that is located adjacent to the opposite wall side of the cavity. Alternatively, the slot formed in the insulation is limited to cutting or being formed in no more than 90% of the outer perimeter of the insulation, and typically no more than about 80% of the outer perimeter of the insulation. The slot formed in the insulation enables the insulation to fit about a 90° elbow in a pipe as illustrated in FIG. 36. The widest angle of the slot is typically located on the slit 2330; however, this is not required.

Figure 37:
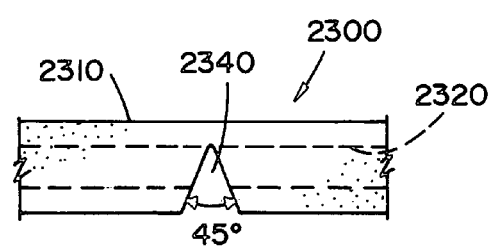
Figure 38:
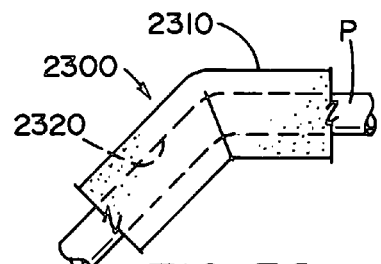

Referring now to FIGS. 37 and 38, insulation 2300 is formed so as to conveniently fit about a 45° elbow joint in a pipe P. As shown in FIG. 37, a slot 2340 is cut or formed in insulation 2300. The slot forms a generally 45° angle; however the angle can be about 30-60°. The depth of the slot is such that it does not completely penetrate through the complete cross-section of the insulation. As shown in FIG. 37, the slot penetrates through one side of the insulation, through a first wall of cavity 2320, and stops at the opposite second wall side of the cavity such that generally one outer shell thickness is maintained. As can be appreciated, the slot can be designed to penetrate at least 50% into cavity 2320 and no more than 75% into the outer shell wall that is located adjacent to the opposite wall side of the cavity. Alternatively, the slot formed in the insulation is limited to cutting or being formed in no more than 90% of the outer perimeter of the insulation, and typically no more than about 80% of the outer perimeter of the insulation. The slot formed in the insulation enables the insulation to fit about a 45° elbow in a pipe as illustrated in FIG. 38. The widest angle of the slot is typically located on the slit 2330; however, this is not required.

Referring now to FIGS. 39 and 40, two pieces of insulation 2300, 2400 are formed so as to conveniently fit about a T-connection in two pipes P. As shown in FIG. 39, a slot 2340 is cut or formed in insulation 2300. The slot forms a generally 90° angle; however the angle can be about 70-110°. The depth of the slot is such that it does not completely penetrate through the complete cross-section of the insulation. As shown in FIG. 39, the slot penetrates through one side of the insulation, through a first wall of cavity 2320, and stops prior to reaching the opposite second wall side of the cavity. As can be appreciated, the slot can be designed to penetrate a distance of about 30-100% into cavity 2320 and no more than 75% into the outer shell wall that is located adjacent to the opposite wall side of the cavity. Alternatively, the slot formed in the insulation is limited to cutting or being formed in no more than 90% of the outer perimeter of the insulation, and typically no more than about 80% of the outer perimeter of the insulation. The slot formed in the insulation enables a portion of insulation 2400 to be received in the slot as illustrated in FIG. 40. The widest angle of the slot is typically located on the slit 2330; however, this is not required. Insulation 2400 includes a shaved end portion 2430 that is designed to fit into slot 2340 of insulation 2300. The shaved portion is configured so as to snugly fit into slot 2340. When slot 2340 has a cut angle of about 90°, the shaped end portion of insulation 2400 has an angle from face to face of the shaved portion of about 240°-300°.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. An improved clamp for supporting a length of tubular member, said clamp comprising a holding section, a spacer section, and a connection arrangement having first and second connection portions, said holding section including a cavity that is designed to encircle over 50% of an outer perimeter of the tubular member, said spacer section including at least two spacer flanges designed to be at least partially off-set from one another and generally disposed in a same plane that are connected between said holding section and said connection arrangement and forms a space between said holding section and said connection arrangement, said connection arrangement designed to be and is secured to a building structure, the at least two spacer flanges are positioned edge to edge from one another when the connection arrangement is secured to a building and the first and second connection portions extend at substantially right angles relative to respective first and second spacer portions.

2. The improved clamp as defined in claim 1, wherein said tubular member is a pipe.

3. The improved clamp as defined in claim 1, wherein at least a portion of said clamp includes color coding for use in identifying a particular tubular member for use with the clamp.

4. The improved clamp as defined in claim 1, wherein said holding section includes a one-piece housing, at least a portion of said housing formed of a flexible or bendable material.

5. The improved clamp as defined in claim 1, wherein said holding section includes at least one gripping member.

6. The improved clamp as defined in claim 1, wherein said spacer section includes at least one spacer flange having a generally planar shape between said holding section and said connection arrangement, said at least one spacer flange separating said holding section from said connection arrangement by at least about 0.2 inch.

7. The improved clamp as defined in claim 1, wherein said spacer section includes said at least two spacer flanges and a connection arrangement, said connection arrangement designed to connect together said two spacer flanges.

8. The improved clamp as defined in claim 1, wherein said spacer section includes said at least two spacer flanges, said two spacer flanges designed to face one another when said clamp is secured to a building structure.

9. An improved clamp for supporting a length of tubular member, said clamp comprising a holding section, a spacer section, and a connection arrangement, said holding section including a cavity that is designed to encircle over 50% of an outer perimeter of the tubular member, said spacer section including at least one spacer flange that is connected between said holding section and said connection arrangement and forms a space between said holding section and said connection arrangement, said connection arrangement designed to be secured to a building structure, wherein said spacer section includes two spacer flanges, said two spacer flanges designed to be at least partially off-set from one another when said clamp is secured to a building structure and are disposed in a same radial plane extending perpendicularly from a tangent to the tubular member, wherein the connection arrangement extends at substantially right angles relative to respective first and second spacer portions.

10. The improved clamp as defined in claim 1, wherein said spacer section includes said at least one spacer flange having a landing, said landing designed to facilitate in orienting said clamp on the building structure.

11. The improved clamp as defined in claim 1, wherein said connection arrangement includes at least one leg having at least one gripping member.

12. The improved clamp as defined in claim 1, wherein said connection arrangement includes first and second legs, each of said first and second legs includes at least one connection opening.

13. The improved clamp as defined in claim 1, wherein said connection arrangement includes a first leg and a second leg, said first leg includes at least one connection opening, said second leg includes at least one connection slot.

14. The improved clamp as defined in claim 1, wherein said holding section has a low, non-bulky profile to facilitate in inserting insulation about the holding section while the holding section at least partially encircles said tubular member and the connection arrangement is secured to a building structure.

15. The improved clamp as defined in claim 1, wherein said spacer section has a width that lies generally in a same plane as a longitudinal length of the tubular member when the holding section at least partially encircles said tubular member.

16. A clamp for supporting an outer, substantially cylindrical outer surface of an associated member, the clamp comprising:
a holding portion dimensioned and configured for receipt over the outer surface of the associated member;
first and second spacer portions extending from the holding portion in a direction substantially radially from the outer surface of the associated member and at least partially off-set from one another and generally disposed in a same plane; and
first and second connection portions connected to the first and second spacer portions, respectively, configured for securing the clamp to an associated structure, the first and second connection portions axially disposed adjacent one another in a same plane offset from the outer surface of the associated member by the spacer portions, the first and second connection portions extend at substantially right angles relative to respective first and second spacer portions.

17. The clamp of claim 16, wherein the first and second connection portions have a substantially planar conformation for securing against the associated structure.

18. The clamp of claim 16, wherein the holding portion is a substantially hollow, cylindrical sleeve adapted for receipt over the outer surface of the associated member.

19. The clamp of claim 18, wherein the first spacer portion extends from a first end of the substantially cylindrical sleeve, and the second spacer portion extends from a second end of the substantially cylindrical sleeve.

20. The clamp of claim 19, wherein the first and second spacer portions have substantially similar axial dimensions.

21. A clamp for supporting an outer, substantially cylindrical outer surface of an associated member, the clamp comprising:
a holding portion dimensioned and configured for receipt over the outer surface of the associated member, the holding portion is a substantially hollow, cylindrical sleeve adapted for receipt over the outer surface of the associated member;
first and second spacer portions extending from the holding portion in a direction substantially radially from the outer surface of the associated member, the first spacer portion extends from a first end of the substantially cylindrical sleeve, and the second spacer portion extends from a second end of the substantially cylindrical sleeve, the first and second spacer portions are disposed in a same radial plane extending perpendicularly from a tangent to an outer surface of the sleeve; and
first and second connection portions connected to the first and second spacer portions, respectively, configured for securing the clamp to an associated structure, the first and second connection portions axially disposed adjacent one another in a same plane offset from the outer surface of the associated member by the spacer portions.

* * * * *